US008099336B2

(12) United States Patent
Klim et al.

(10) Patent No.: US 8,099,336 B2
(45) Date of Patent: Jan. 17, 2012

(54) COMPONENT INVENTORY MANAGEMENT

(75) Inventors: Thomas R. Klim, Neenah, WI (US); Brian K. Rhodes, Larsen, WI (US)

(73) Assignee: Binforma Group Limited Liability Company, Dover, DE (US)

(*) Notice: Subject to any disclaimer, the term of this patent is extended or adjusted under 35 U.S.C. 154(b) by 239 days.

(21) Appl. No.: 11/757,050

(22) Filed: Jun. 1, 2007

(65) Prior Publication Data
US 2008/0301010 A1 Dec. 4, 2008

(51) Int. Cl.
G06Q 10/00 (2006.01)
G06Q 1/14 (2006.01)
G06G 40/00 (2006.01)

(52) U.S. Cl. ............... 705/28; 705/22; 235/379
(58) Field of Classification Search .................. 705/22, 705/28
See application file for complete search history.

(56) References Cited

U.S. PATENT DOCUMENTS

| | | | |
|---|---|---|---|
| 4,457,772 A | 7/1984 | Haynes et al. | |
| 4,803,634 A | 2/1989 | Ohno et al. | |
| 5,191,534 A * | 3/1993 | Orr et al. ................... | 700/105 |
| 5,216,612 A | 6/1993 | Cornett et al. | |
| 5,712,989 A | 1/1998 | Johnson et al. | |
| 5,819,232 A | 10/1998 | Shipman | |
| 6,182,053 B1 | 1/2001 | Rauber et al. | |
| 6,647,380 B1 * | 11/2003 | Yotsukura ................ | 707/2 |
| 6,671,673 B1 | 12/2003 | Baseman et al. | |
| 6,865,434 B1 | 3/2005 | Lin et al. | |
| 7,096,082 B1 * | 8/2006 | Connelly ................. | 700/97 |
| 2002/0077850 A1 | 6/2002 | McMenimen et al. | |
| 2003/0055753 A1 * | 3/2003 | Dellar et al. ............... | 705/29 |
| 2003/0101107 A1 | 5/2003 | Agarwal et al. | |
| 2003/0110104 A1 | 6/2003 | King et al. | |
| 2003/0158795 A1 | 8/2003 | Markham et al. | |
| 2005/0065858 A1 | 3/2005 | Tenzer et al. | |
| 2005/0102203 A1 | 5/2005 | Keong | |
| 2005/0159971 A1 | 7/2005 | Woehler | |
| 2005/0216366 A1 | 9/2005 | Vincent et al. | |
| 2006/0089867 A1 | 4/2006 | Sakuma et al. | |

FOREIGN PATENT DOCUMENTS

EP 1251656 A1 10/2002

OTHER PUBLICATIONS

Abstract of Japanese Patent No. JP2003122866 (Apr. 25, 2003).
Abstract of Japanese Patent No. JP2003242270 (Aug. 29, 2003).
Abstract of Japanese Patent No. JP2004062801 (Feb. 26, 2004).
U.S. Appl. No. 11/321,759, filed Dec. 29, 2005, Klim et al., Spare Parts Inventory Management.

* cited by examiner

*Primary Examiner* — Fahd Obeid
(74) *Attorney, Agent, or Firm* — Perkins Coie LLP

(57) ABSTRACT

A component management system can comprise one or more software tools that streamline creation and adjustment of documents that indicate parts stocking requirements for manufacturing assets. The manufacturing assets may comprise machines, sub-assemblies, and the like, while the components comprise parts, tools, and other equipment used to maintain operation of the manufacturing assets. The component management system can be used to enhance authorization processes by handling authority to stock documents online. Furthermore, by interfacing with an enterprise resource planning system, such as SAP, component and inventory management can be made more efficient and flexible. For instance, simulations of future versions of the installed component base can be used to generate component forecast documents useful for proactive component management. As another example, by handling asset definition and authority to stock in an online form, information can be easily retrieved from and uploaded to an enterprise resource management system.

32 Claims, 7 Drawing Sheets

COMPONENT INVENTORY MANAGEMENT

BACKGROUND

A manufacturing enterprise may use hundreds, if not thousands, of components in support of various processes. For example, the enterprise may include one or more plants or facilities, with each plant/facility using machines or equipment to meet the business goals of the enterprise. Each machine or piece of equipment may comprise and/or be associated with a number of components such as individual parts, sub-assemblies, and tools used for proper maintenance and operation. In order for the enterprise to meet its business goals, sufficient quantities of components are kept available for use in maintaining existing processes and beginning operation of new processes.

However, keeping sufficient quantities of components available can entail significant challenges and risks. For example, if too many components are maintained in inventory, the enterprise may tie up excess capital in unneeded or infrequently used components, such as rarely-needed or obsolete spare parts. On the other hand, if insufficient quantities of components are maintained in inventory, the enterprise risks disruption in existing processes and/or delay in initiating new processes, both of which can result in significant financial losses. Accordingly, enterprises typically invest appreciable resources in the successful management of spare parts inventory.

SUMMARY

As used herein, the term "manufacturing asset" is meant to include any equipment used in support of one or more processes carried out by an enterprise. By way of non-limiting example, a manufacturing asset can comprise a machine, an assembly line comprising multiple machines, and/or an entire plant or facility (with the plant or facility comprising one or more machines and/or assembly lines). However, the term "manufacturing asset" is not meant to refer to raw materials, partially-processed materials, or other materials that are operated upon during a manufacturing process.

The term "component" is meant to refer to any constituent part or parts of a manufacturing asset and to any other parts used in support or maintenance of the operation of an asset (e.g. tools, toolkits, and the like). The scope of the term "component" will vary according to the circumstances of the manufacturing asset under consideration. For instance, if the manufacturing asset comprises an entire facility, then the components thereof can comprise one or more assembly lines in the plant. If the manufacturing asset comprises an assembly line, the components thereof can comprise individual machines. If the manufacturing asset comprises a machine, then components thereof can comprise parts and sub-assemblies. If the manufacturing asset comprises a part or sub-assembly, then the components thereof can comprise still other parts or sub-assemblies.

Generally, during the design process, contextual data can be used to specify one or more manufacturing assets that are subject to design changes, review, or other activities. For purposes of the discussion below, the context data can be specified by referring to a "project," with the project denoting one or more manufacturing assets under consideration. For example, a redesign project may specify a manufacturing asset, such as a machine, or part of a machine. The components for purposes of the redesign project can comprise the parts, sub-assemblies, and other equipment constituting the machine or sub-assembly under consideration in the project.

The term "installed base" is meant to refer to the manufacturing assets that are considered to be in use by an enterprise at a given time and to differentiate those assets from other equipment and components, such as retired assets, spare components, and the like. The scope of the "installed base" can vary according to the level of the enterprise at which the installed base is being considered. For example, for an entire enterprise, the installed base will comprise all manufacturing assets and components thereof. For a plant, the installed base will comprise all manufacturing assets (such as machines and/or assembly lines (and components thereof)) at the plant. For a machine, the installed base will comprise parts and sub-assemblies of the machine.

The present subject matter is generally directed improving the capability of an enterprise to effectively manage its inventories of components used in maintaining operations while simultaneously reducing the amount of resources devoted to component inventory management. In some embodiments, significant savings may be achieved by tracking the evolution of component requirements introduced by proposed changes to the installed base of manufacturing assets. For instance, modifications to existing asset structures may result in changed component requirements. Adding a new asset to the installed base, such as adding equipment for a new manufacturing process, can also change parts stocking requirements, as can removal of a manufacturing asset from the installed base. Therefore, by tracking the extent of changes during the design process, enterprise personnel can be provided with information in order to make proactive parts stocking and other management decisions. Additionally or alternatively, aspects of component stocking and other management decisions may be fully or partially automated based on identifying and tracking the changes.

For instance, a maintenance parts planning software tool or software tools can be provided to facilitate component inventory management. The maintenance parts planning tool(s) can be used to monitor changes in component requirements. Based on the determined changes, a component demand forecast can be generated by comparing the parts requirements for manufacturing assets as modified to the parts requirements for manufacturing assets in absence of the modification. Additionally, in some embodiments, by tracking changes in component requirements, the software tool(s) can generate other documents to support component inventory management. As an example, if a change to a manufacturing asset results in a requirement for an enterprise to stock a currently-unstocked component, the software tool(s) can generate an authority to stock document in order to begin the approval process for stocking the component while the design approval process is ongoing.

In some embodiments, a method of managing inventory can comprise maintaining at least one queue. For example the queue may comprise at least one designer queue. For example, one or more computers, such as servers, can be configured by a maintenance parts planning software tool or tools to provide an interface where design (and/or other) personnel can access and modify documents associated with various tasks. The method can further comprise placing an asset definition document into the designer (or other) queue. The asset definition document can comprise data identifying one or more component stocking requirements associated with at least one manufacturing asset. For example, the manufacturing asset may comprise a machine, sub-assembly, or an entire process that is under consideration in one or more projects. The component stocking requirements may comprise, for example, a list of parts, sub-assemblies, modules, tool kits, and/or other constituent portions of the manufacturing asset or equipment otherwise associated with maintaining and supporting operation of the asset, along with data indicating whether and how the component(s) are to be stocked.

For instance, in some embodiments, the asset definition document can be presented as a spreadsheet or other electronic document identifying the various components of an asset. The method can further comprise receiving design data defining one or more modifications to the component requirement(s) associated with manufacturing asset. For example, a technician or other appropriate personnel may manually or automatically enter changes to the components used on or with the manufacturing asset and/or changes to stocking requirements. For example, if the asset comprises a machine and a designer is redesigning the machine to use new parts, the design data may comprise data identifying changes and/or additions to parts used in the existing design. As another example, if a designer is implementing a new process utilizing a previously-unused machine, the design data may identify the parts used in building a new machine. The modifications can comprise changes to the number of one or more components to be stocked.

After design data has been received, the method can comprise updating the asset definition document to define the at least one manufacturing asset as modified. For example, the technician may manually enter changes to the spreadsheet or other electronic documents. Alternatively or additionally, the technician may export changes form one or more other software programs, such as a design program. The changes can be saved as an updated version of the asset definition document. For example, the asset definition document may support version tracking whereby the latest changes are preserved in the asset definition document alongside previous changes. Alternatively, the maintenance parts planning software tool may provide for version control in order to differentiate the original asset definition document from the updated version or versions.

In some embodiments, prior to receiving design data, the method can comprise receiving selection data that identifies at least one manufacturing asset which is to be the subject of the design change or changes. For example, if a technician is modifying the design for an existing machine, the technician may identify the machine (or portion of the machine) that is being modified. Alternatively, the selection data may indicate that a new manufacturing asset is being defined. As was noted above, a project may be created or selected, with the project identifying one or more manufacturing assets that are to be designed, redesigned, or otherwise altered. Projects may furthermore define other information, such as personnel and queue structure associated with approval of a design changes.

The method can comprise querying at least one enterprise resource planning dataset for data associated with the at least one identified manufacturing asset. For instance, the enterprise may maintain a centralized or distributed database (or multiple databases) for enterprise resource management purposes. For example, the enterprise resource management database may comprise one or more databases associated with a system such as SAP used by the enterprise to track manufacturing asset history, costs, and the like. The enterprise resource management database can comprise data that defines various manufacturing assets, such as the components and components stocking requirements for a machine and technical, financial, and other data relating to each component. Querying at least one enterprise resource planning dataset can comprise accessing the enterprise resource planning system database(s) directly in some embodiments and indirectly in other embodiments.

For example, the method can comprise creating an image of a plurality of portions of the data in the enterprise resource planning system. The enterprise resource planning dataset can be queried by accessing the image rather than accessing the enterprise resource planning system directly. In some embodiments, different portions of the enterprise resource planning system may be imaged at different times. For example, portions of the enterprise resource planning data corresponding to data regarding manufacturing assets that are the subject of active projects may be imaged on a more regular basis than other portions. In some embodiments, enterprise resource planning data items corresponding to manufacturing assets that are the subject of one or more active projects can be imaged on a nightly basis, while data items associated with other manufacturing assets are imaged every thirty days. The image of the enterprise resource planning dataset can be maintained, for example, by one or more computing devices associated with a component management system that also provides the designer and other queues and manages asset definition documents.

Based on results of the query, the method can further comprise generating an asset definition document, which is the document that is placed into the designer queue. If a new manufacturing asset is being defined, the asset definition document may comprise a "blank slate" since the enterprise resource management database may not contain information pertaining to an as-yet-uncreated asset. Of course, in some embodiments, a new asset definition document pertaining to newly-defined assets may be based on or patterned after documents for currently-existing assets and/or templates. On the other hand, if a currently-existing manufacturing asset is being modified, existing data from the enterprise resource planning dataset can be used to populate the asset definition document.

In some embodiments, the method can further comprise determining a change or changes to at least one component requirement associated with the at least one manufacturing asset. For instance, as noted above, the components specified in an asset definition document can be changed based on planned or proposed modifications to the manufacturing asset. Determining can comprise comparing contents of the asset definition document as updated to data reflecting the "current" component requirements for the asset. For example, the contents of the asset definition document can be compared to the component requirement stocking requirements for the manufacturing asset as specified in the enterprise resource planning dataset. As another example, the contents of the asset definition document can be compared to the component stocking requirements for the manufacturing asset as specified in a previous version of an asset definition document.

The method can further comprise determining if authority to stock approval is needed based on (at least) the component stocking requirements as modified. For instance, the component stocking requirements as modified by indicate that a previously-unstocked component is indicated as required to be stocked. Depending on the enterprise, in some embodiments, the addition of such a component may require one or more levels of approval. For instance, in some embodiments, the addition of any currently-unstocked component may require approval. Of course, in other embodiments, not all such additions may require approval.

In some embodiments, based on determining if approval is needed, the method can comprise determining if one or more authority to stock documents associated with the asset definition document(s) that add the requirement are available. If such authority to stock document(s) are available, the method can comprise updating the authority to stock document or documents to comprise data related to the component for which a requirement is added. If one or more authority to stock documents are not available, the method can comprise generating an authority to stock document comprising data related to the component for which a requirement is added.

In many manufacturing enterprises, decisions as to component stocking and ordering may be subject to multiple levels of oversight. This oversight may be necessary to ensure optimal inventory levels, but can represent a significant use of resources. For instance, if the approval process begins after a design is finalized, then the approval process can delay implementation of a design that is otherwise ready for production. However, by generating or updating authority to stock documents in response to design changes, the approval process can operate (at least partially) in parallel with the design process so that components can be made available more quickly.

For example, if a manufacturing asset is modified to include a new part, the change in parts requirements can trigger generation of an authority to stock document whereby stocking of the new part(s) can be approved. In some embodiments, the authority to stock document may be triggered by data specified in the asset definition document. For example, the technical or other personnel updating an asset definition document may specify that a part is to be stocked by the enterprise, such as by using a checkbox. The method can comprise determining if the part is currently stocked by the enterprise and, if it is not currently stocked, generating the authority to stock document.

The authority to stock document initially may be placed in the designer queue and/or another queue. The maintenance part planning software tool(s) can support multiple queues for distribution, alteration, and approval/rejection of authority to stock document(s) associated with an asset definition document. In some embodiments, based on the identification of the component in the asset definition document, other data can be included in the authority to stock document. For instance, part identification and specification data, formulas for determining estimated use and replacement intervals, and data for determining an estimated procurement time may be available regarding the component. For example, such information may be available in the enterprise resource planning dataset, which can include some or all of such data for each component. Any such available information can be exported to the authority to stock document, which may result in considerable savings of resources inasmuch as the personnel creating or reviewing the authority to stock document will not need to independently obtain such information.

In some embodiments, the change or changes to the manufacturing asset can be used as the basis for a component stocking forecast document. For instance, the component stocking forecast document can comprise data that defines a projected level of component stocking requirements if the design (or other) changes proposed in an asset definition document are implemented. For example, the component stocking forecast document can indicate anticipated changes in the installed base of components at a machine, facility, or enterprise level. In some embodiments, the component stocking forecast document can be generated by accessing data comprising the changes in component requirements along with a date associated with each change. An enterprise resource management dataset can be queried to determine current component stocking requirements, such as the requirements associated with the current installed base. Based on the determined change or changes in component requirements, the projected date associated with each change, and current component stocking requirements, the future component stocking requirements can be simulated. The simulated requirements can then be used in the component stocking forecast document.

For example, the component stocking forecast document can comprise an estimate of the installed base for the enterprise as the installed base would appear if the changes specified in one or more asset definition documents associated with active projects are implemented. In some embodiments, the component stocking forecast document can further comprise one or more indicators of time-sensitivity. For example, the date associated with a change in a component stocking requirement may fall within a certain time range that warrants special handling. As an example, if a component needs to be stocked or ordered within 14 days of the date the forecast document is generated in order to implement a change on time, the component may be highlighted or otherwise annotated in the component stocking forecast document. The highlighting and/or other annotation(s) may change according to other factors. As another example, if the simulation indicates that a component should have been ordered at a date prior to the date the component stocking forecast document is generated, then the component may be highlighted.

In some embodiments, the method can include maintaining at least a first and second queue, such as a designer queue and one or more supervisory queues. The method can comprise receiving release data regarding at least one asset definition document in a first queue, such as a designer queue and placing the asset definition document in the second queue, such as a supervisory queue, in response to the release data. For an asset definition document in the second queue, the method can further comprise receiving supervisory design data defining one or more supervisory modifications to the manufacturing asset. For example, a manager or other supervisor may review design changes provided by a technician or other user of a design queue. The manager may wish to make one or more changes to the design, and can make such changes by updating the asset definition document while it is in the supervisory queue.

The method can comprise triggering generation of an authority to stock document and/or triggering changes to an existing authority to stock document associated with the asset definition document based on the changes made by the manager or other user(s) of the second queue. For example, if the manager substitutes a currently-unstocked part with a part that is currently stocked by the enterprise, the change can trigger deletion or suspension of an authority to stock document that is currently in a queue. As another example, if the manager adds a currently-unstocked part, then an authority to stock document can be generated. If an authority to stock document is already associated with the asset definition document (e.g. to obtain approval for another currently-unstocked part), then the existing authority to stock document can be updated to also include the added currently-unstocked part. Of course, the generation/change of an authority to stock document may be triggered in other ways. For instance, the components in an asset definition document may remain unchanged, with the manager changing a stocking decision in the document.

The method can further comprise maintaining a plurality of queues, such as at least a first, second and third queue, which may comprise a designer queue and multiple supervisory queues. For instance, a first supervisory queue may receive the asset definition document and either approve or reject the document. If the document is approved, it may be provided to a second supervisory queue. If the document is rejected, it may be returned to another queue, such as the designer queue.

In some embodiments, the method can further comprise receiving approval data for at least one asset definition document in a queue. If the approval data indicates that a design is approved, the method can comprise modifying data in at least one enterprise planning database to reflect the modifications to the manufacturing asset as defined in the asset definition document in the supervisory queue. For instance, the component management system can transmit data to an enterprise resource planning system to change data maintained by the enterprise resource planning system so as to reflect at least one component stocking requirement as defined in the approved asset definition document. For example, in an enterprise using SAP, once an asset definition document has traversed required levels of approval, the changes to the manufacturing asset(s) defined therein may be considered as approved for implementation, and the changes can be uploaded into SAP.

However, if the approval data indicates rejection, the method can comprise placing the asset definition document into a designer queue without modifying the enterprise resource management database. For example, if a supervisor rejects design changes by a technician, the asset definition document may be placed in another queue. The document may be returned to the designer queue or a supervisory (or other) queue between the supervisor queue where the document was rejected and the designer queue.

In some embodiments, only certain supervisory queues may initiate modifications to the enterprise resource planning database. For instance, one or more intermediate supervisory queues may lie between a designer queue and the supervisory queue that can initiate modifications, with the intermediate supervisory queues limited to approving or rejecting the asset definition document. Some or all of the intermediate supervisory queues may have authority to modify the asset definition document, as well.

In some embodiments, the method may comprise providing an authority to stock document to at least one supervisory queue in response to approval data. The authority to stock document can be associated with one or more asset definition documents and may be updated to reflect changes in those documents. The method can further comprise uploading data from the authority to stock document into an enterprise resource planning system once final approval has been received. For example, data can be transmitted to an enterprise resource planning system so that the enterprise resource planning system includes data specified in the approved authority to stock document. For instance, component identification, ordering and delivery data, proof of approval, and the like can be uploaded and/or existing data in the enterprise resource planning system can be modified in order to document approval of parts that were, as of the time of a design change, not stocked by an enterprise.

A component management system can comprise at least one computing device adapted to provide component management functionality. One or more computing devices may be used, and the device(s) may comprise any suitable type or arrangement of hardware and software. The device(s) may be adapted to provide functionality by one or more software applications and/or specialized hardware components.

BRIEF DESCRIPTION OF THE DRAWINGS

A full and enabling disclosure of the present disclosure, including the best mode thereof to one skilled in the art, is set forth more particularly in the remainder of the specification, including reference to the accompanying figures, in which.

Figure 1:
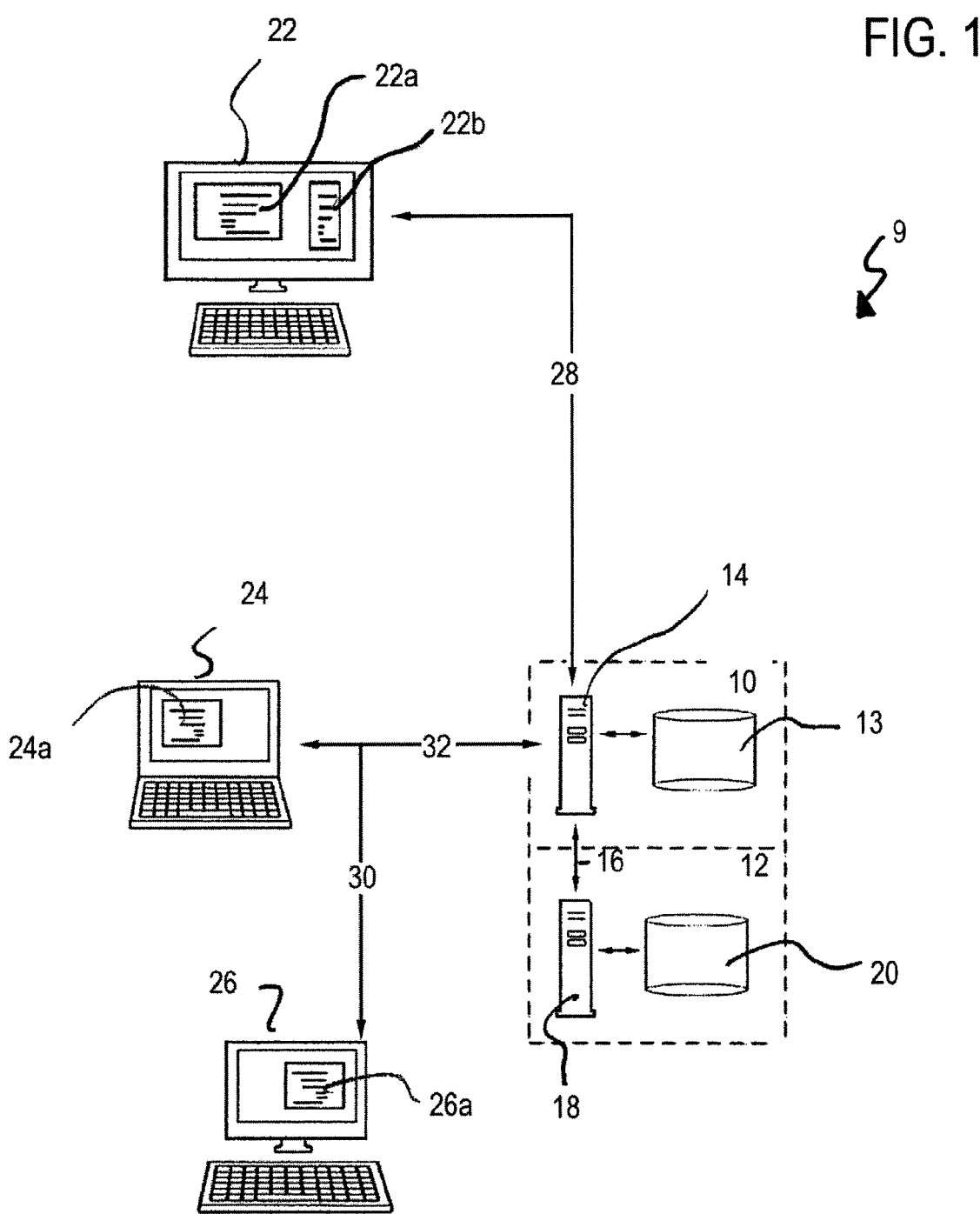
FIG. 1 is a block diagram showing hardware components and network connections used in providing a component management system, along with exemplary components illustrating hardware used in providing an enterprise resource planning system.

Repeat use of reference characters in the present specification and drawings is intended to represent the same or analogous features or elements of the present disclosure.

DETAILED DESCRIPTION

Reference now will be made in detail to various embodiments of the present subject matter, one or more examples of which are illustrated in the accompanying drawings. Each example is provided by way of explanation of the present disclosure, which is not restricted to the specifics of the examples. In fact, it will be apparent to those skilled in the art that various modifications and variations can be made without departing from the scope or spirit of the present invention. For instance, features illustrated or described as part of one embodiment, can be used on another embodiment to yield a still further embodiment. Thus, it is intended that the present disclosure cover such modifications and variations as come within the scope of the appended claims and their equivalents.

FIG. 1 is a block diagram illustrating an exemplary system 9 which can be used to implement embodiments of the present subject matter. In this example, component management system 10 includes a component management system server 14 and component management system database 13. Server 14 may comprise any suitable number of computing devices. The computing devices may be solely devoted to use in the component management system or may support component management functionality alongside other tasks. Database 13 may comprise any suitable logical and/or physical arrangement of components used to provide for data storage and retrieval. For purposes of component management, database 13 can comprise data defining manufacturing assets or parts thereof, the status of various documents used in the approval process for component changes (and the documents themselves), and archived data regarding prior design changes and approvals. Database 13 may comprise a dedicated component management database or may comprise a portion of another, larger database. Component management system 10 may comprise any suitable number or arrangement of computing devices, and may comprise components located at a single location or across multiple locations.

Enterprise resource planning system 12 also comprises a server, in this instance server 18, along with an enterprise resource planning database 20. Enterprise resource planning systems such as the well-known SAP system have been in use to provide support for accounting, inventory, and other enterprise activities. Typical systems use one or more computing devices, such as server 18 alongside one or more databases, such as database 20, to store and control enterprise information in a coordinated manner. As was noted above with regard to server 14, server 18 may comprise any suitable number, type, and/or arrangement of computing devices, and database 20 may comprise a single or multiple databases in any suitable logical or physical arrangement. The components of enterprise resource planning system 12 may be located at a single location or may be distributed across multiple locations. Although SAP is a currently-popular suite of enterprise resource planning tools, the present subject matter can be used alongside additional or alternative tools and is not limited to use with systems utilizing SAP software. For instance, other enterprise resource planning software suites, such as those provided by Oracle, MicroSoft, or BAAN, may be used. As another example, enterprises may utilize proprietary or internally-developed software for resource management purposes.

Although the examples herein depict a single enterprise resource planning system, the component management system can be adapted to function with multiple systems that provide the functionality of the single enterprise resource planning system of the examples.

Connection 16 represents the exchange of data between the component management system 10 and the enterprise resource planning system 12. For instance, if component management system 10 and resource planning system 12 utilize different computing devices, then connection 16 may represent one or more network connections (whether wide-area, local-area, and/or other connections) between the systems. If component management system 10 and resource planning system 12 utilize the same or overlapping computing devices, then the data may be transferred between the two systems internally.

Generally speaking, enterprise resource management planning system 12 is used by component management system 10 as a source of data regarding the "current" state of manufacturing assets when changes to assets are to be made. For instance, an enterprise resource planning system will typically include inventory data regarding the enterprise's installed base of components. The present subject matter does not require the use of a specific type, architecture, or data format for the enterprise resource planning system 12 so long as the enterprise resource planning system 12 makes component data for the installed base available. As an example, for a given plant, the enterprise resource planning system can make inventory data available that comprises bills of material, stocking requirements, and other parts data regarding the components of the various assembly lines, machines, and other equipment in active use at the plant.

However, if the installed base is to be changed (e.g. through redesign of one or more manufacturing assets, addition of a manufacturing asset or assets, or deletion of a manufacturing asset or assets), then the component requirements for the enterprise will change. The data from enterprise resource planning system 12 can be used to populate various planning documents used during the process of identifying and planning for changes in the enterprise's component requirements during design/redesign of manufacturing assets. Component management system 10 can be used maintain those planning documents, track the status of the changes to component requirements associated with the design change(s), and otherwise provide coordination during the design change process. This coordination can extend to any level of the enterprise. Furthermore, component management system 10 can enable partial or full automation of aspects the approval process for stocking components.

In some embodiments, the data maintained by enterprise resource planning system 12, such as the contents of enterprise resource planning system database 20, is not accessed directly from the enterprise resource planning system during the design and approval process. Instead, one or more images of the enterprise resource planning system can be obtained and maintained, for example, by component management system 10. Therefore, data obtained from the enterprise resource planning system is referred to generally as the "enterprise resource planning system dataset" herein since the data may be accessed from the enterprise resource planning system directly or indirectly. For instance, it may be advantageous in some circumstances to provide an image of the data maintained by enterprise resource planning system 12, with the image accessible to the component planning system 10, so that the enterprise resource planning system 12 can be allowed to function in its normal support roles without interference from personnel during the design process. For example, by imaging some or all of the enterprise resource planning system data, queries and other system overhead associated with proposed changes to the installed base and associated stocking decisions can be handled by the component system 10 rather than taxing the resources of the enterprise resource planning system.

FIG. 1 further illustrates a plurality of user computing devices, namely user computing devices 22, 24, and 26. Each computing device may comprise, for example, a laptop, server, desktop, tablet, or other computer, or another computing device such as a personal digital assistant (PDA), cellular telephone, network terminal, or the like.

Each computing device is linked to the component management system 10 through any suitable number and arrangement of network links. Computing device 22 is connected to component management system 10 via network link 28, computing device 24 is connected to component management system 10 through network link 32, and computing device 26 is connected to component management system 10 through network links 30 and 32.

The network links are meant for purposes of illustration only, and not as a limitation. Any suitable network links may be used, whether direct or indirect. For example, some or all of the computing devices 22, 24, 26, component management system server 14, and/or enterprise resource planning server 18, may be linked to a wide-area network, such as the Internet, a local area network, or enterprise intranet. The devices shown in FIG. 1 may be linked to one another in multiple ways; for example, although not shown in FIG. 1, each device 22, 24, 26 may be further connected to enterprise resource planning server 18, as well.

In some embodiments, component management system 10 can comprise one or more component management software tools that configure system 10 to provide various functionality to support component management. Although the term "software tool(s)" is used, the actual implementation may be software-based, hardware-based, or may utilize a combination of hardware and software. The software tool(s) can configure component management system server 14 to provide an interface whereby various users can access queues and the contents thereof. Component management documents and other documents can be placed into and removed from the various queues by the users and/or by the component management system. For example, each user may have access to one or more queues, with document access, document retrieval, and document modification rights determined by each user's respective role (or roles) in the design and/or component procurement approval process. Access, retrieval, modification, and other permissions, as well as the relative relationships of the queue users to one another can be defined by data during configuration of component management system 10. Although the term "document" is used, it is to be understood that the particular data structures used by component management system 10 can vary. For instance, each asset definition document, authority to stock document, and other document can comprise a separate file, such as a spreadsheet or other document in some embodiments.

Computing device 24 in FIG. 1 may, for instance, correspond to a computing device used by a technician in making design changes to a manufacturing asset. Thus, window 24a may represent a view of the contents of designer queue associated with and accessible by the technician. Computing device 26 may correspond to a device used by a supervisor of the technician, and thus window 26a may represent a view of the contents of supervisory queue. Computing device 22 may represent a device used by an additional supervisor, such as a parts coordinator who manages inventory decisions for a facility or enterprise. Thus, windows 22a and 22b may each comprise views of the contents of another supervisory queue corresponding to the parts coordinator.

Queues and documents may be rendered in any suitable fashion. For example, user queues and documents therein may be rendered using specialized software or modified versions of standard software components (e.g. web browsers, word processing software, spreadsheet software, etc.). The component management server 14 may support any suitable access restriction and/or other security enhancements, such as providing for password-protection to queues over encrypted or otherwise secured connections.

Management of queue contents may be achieved in any suitable way, as well. For instance, component management server 14 may maintain data in component management database 13 identifying the contents and parameters (such as access rights, document paths, etc.) associated with each queue, user, and/or document. The documents themselves may be stored in database 13 and/or at one or more other locations accessible by component management system 10.

As an example, in some embodiments, component management software tool(s) are implemented using the .NET framework of Microsoft Corporation of Redmond, Wash. For example, one or more .NET applications may be provided via component management system server 14, with the applications providing a user interface whereby queues can be accessed in a manner similar to e-mail software. For instance, each user may be provided with an interface that provides lists of tasks and access to shared resources. Furthermore, in some embodiments, the .NET application(s) can provide a spreadsheet-like user interface for viewing and alteration of documents, such as asset definition documents, authorization to stock documents, and/or other documents provided by the software tools. Additionally, the software tool(s) may provide for the documents to be exported in any suitable format or manner. The data used to generate the asset definition documents, authority to stock documents, track project and document status, and the like, can be stored, for example, in an SQL database maintained in component management system database 13 with the .NET application(s) providing a front-end.

In use, documents can be placed into the various queues provided by component management system 10. The documents can be viewed and modified by the users of the system and then forwarded to one or more other users by providing data to the system specifying which queue is to receive the document next. The path of documents, the contents of the documents, and the queue structure will vary according to the needs of the enterprise. In some embodiments, users may have limited or no control as to the address of the next queue to receive a document. For example, some users may be limited to approving a document and/or rejecting a document, while other users can select from a predetermined list of destination queues, while still others are able to specify the queue of their choosing.

For instance, in several examples below, component management system 10 can be configured to provide two paths for two types of documents, namely a first path for asset definition documents and a second path for authority to stock documents. The asset definition documents can be used by technical and other personnel to specify changes in component requirements that are associated with changes to manufacturing assets. The authority to stock documents can represent the approval documents that are used to ensure that proper decision-making procedures have been followed in determining whether and how to stock the components associated with the design changes.

Figure 2:
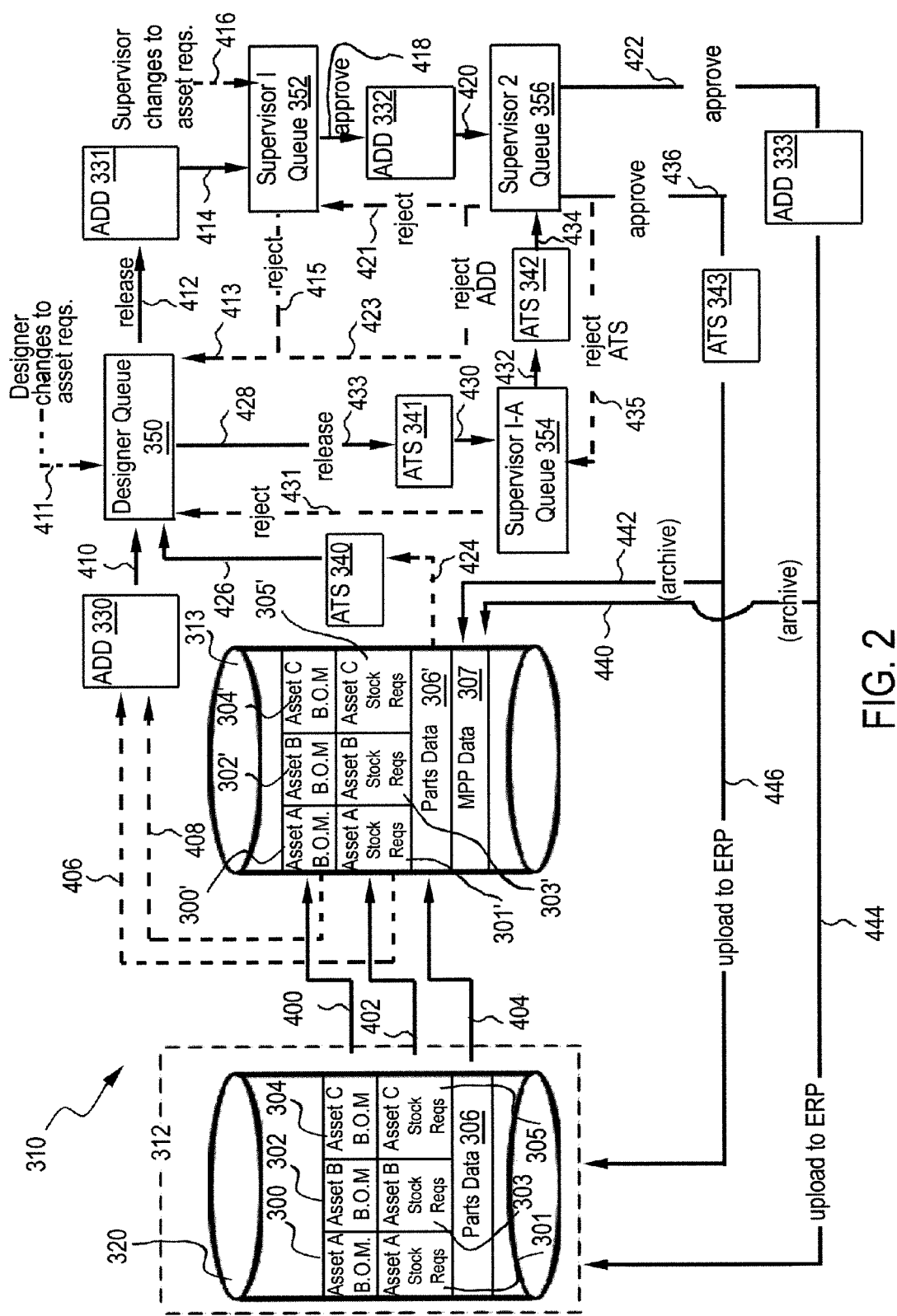
FIG. 2 is a block diagram showing exemplary data structures and data flow in a component management system.

FIG. 2 is a block diagram showing data structures and the flow of data as provided by an exemplary component management system 310. Several examples of component requirement changes and associated actions taken by the system will be discussed in conjunction with FIG. 2. FIG. 2 illustrates an exemplary portion of an enterprise resource planning system 312, namely the contents of an exemplary enterprise resource planning database 320. In this example, the database comprises bills of material 300, 302, and 304 for respective manufacturing assets A, B, and C. The database further comprises component stocking requirements 301, 303, and 305 for assets A, B, and C. For instance, the component stocking requirements may comprise data indicating the desired quantity, location, and ordering schedules for components listed in the bills of material. Enterprise resource planning system database 320 further includes parts data 306. For instance, parts data 306 may comprise technical specifications, manufacturer data, performance data, reordering formulas, and other information maintained in enterprise resource planning system 312 regarding numerous parts. For example, the data may be part of a parts library comprising parts in use by the enterprise and parts not in use by the enterprise.

It bears repeating that the data structures illustrated in FIG. 2 are for purposes of example only. Discrete bills of material and stocking requirements for each asset and a discrete set of parts data are shown in FIG. 2 for ease of illustration and explanation. The exact logical and physical arrangement of data in enterprise resource management database 320 and the corresponding image(s) thereof maintained by the component management system can vary according to the particular database implementation used.

FIG. 2 illustrates component management system database 313. In this example, arrows 308 indicate that some or all of the data in enterprise resource planning database 320 is imaged in component management system database 313. For instance, component management system database 313 comprises: images 300', 302' and 304' of respective bills of material 300, 302, and 304; image 306' of parts data 306; images 301', 303', and 305' of stocking requirements 301, 303, and 305, respectively. Component management system database 313 further comprises component management system data 307. System data 307 may comprise additional information used to support operation of the component management system including, but not limited to: data identifying queue structure and contents; data identifying assets and personnel associated with active projects; the contents of documents such as asset definition documents, authority to stock documents, component forecast documents, and the like; user data such as user profiles, preferences, and passwords; and archived versions of data from previous and ongoing projects.

In this example, component management system 310 is configured to provide a plurality of queues comprising a designer queue 350, supervisory queues 352, 354, and 356 (labeled in FIG. 2 as "supervisor I queue" and "supervisor I-A queue, and "supervisor 2 queue", respectively). For purposes of this example, assume the organization of the enterprise comprises a designer who is supervised by supervisor I in design matters and supervisor I-A in parts stocking approval matters. Supervisor 2 in this example has final approval for both parts stocking approvals and design matters.

For instance, assume that the designer is associated with a project to update the design of manufacturing asset "A." For example, manufacturing asset "A" may comprise a sub-assembly in a machine that is being updated to process a new product. In order to do so, the designer and/or other users can provide data to component management system 310 defining the project, such as by identifying users and roles associated with the project, along with the manufacturing asset or assets associated with the project.

An asset definition document 330 can be generated by the component management system based on data regarding manufacturing asset "A." For instance, the component management system may query an enterprise resource management dataset for information regarding asset A, such as a list of components and current parts stocking requirements. This and possibly other information can be used to generate the asset definition document. The dataset may be obtained directly from enterprise resource management databases in some embodiments. However, in this example, the dataset can be obtained by querying the imaged portions of enterprise resource management database 312. Namely, imaged bill of materials 300' and component stocking requirements 301' can be queried to generate/populate asset definition document 330. This exemplary querying and document generation is illustrated by arrows 406 and 408 in FIG. 2.

In some embodiments, a component management system such as system 310 may provide for better parts planning by imaging some portions of the data from enterprise resource planning database 312 more frequently than other portions. For example, in some embodiments, data regarding every manufacturing asset may be imaged from enterprise resource planning database 312 on a regular basis, such as every thirty days. However, such imaging may not always provide the component management system with the best dataset. For instance, between the monthly or other intervals, changes may be made to the installed base of manufacturing assets. As an example, floor changes, such as parts substitutions made by maintenance and other personnel, may occur. Such changes can be reflected in the enterprise resource planning database, but if imaging does not occur on a regular basis, then the asset definition document may be based on outdated information. Returning to the example of floor changes, if a floor change is made after an asset definition document has been generated, then the asset definition document may not reflect the floor change.

Thus, in some embodiments, more recent "snapshots" of certain portions of the enterprise resource planning database are taken. For instance, portions of the enterprise resource planning database 312 regarding assets associated with active projects may be imaged on a nightly basis or at any other suitable interval. The portions may comprise one or more data items sorted in enterprise resource planning database 312, with the data items identified for imaging by cross-referencing component identifiers associated with each data item (and/or other identifiers) to component (or other data items) associated with one or more active projects.

Taking the example of FIG. 2, once manufacturing asset A is designated as part of an active project, then bill of material 300 and stocking requirement data 301 may be imaged on a nightly basis if such nightly imaging is not already occurring. Thus, bill of material image 300' and stocking requirement data image 301' can be refreshed to reflect the most recent changes to the enterprise resource planning database for manufacturing asset A. Additionally, data items associated with asset A and included in parts data 306, such as component information, ordering and delivery formulas, may be imaged to refresh corresponding portions of parts data image 306'. Imaging is generally represented by arrows 400, 402, and 404.

Frequent imaging updates may also advantageously help in coordinating design projects that affect overlapping assets. For example, assume that asset B comprises another sub-assembly of the same machine that utilizes manufacturing asset A. As part of a design initiative, asset B may be modified by another designer or design team that also makes adjustments to manufacturing asset A. For instance, if the asset B sub-assembly is changed, then changes in an interface between the asset B and asset A subassemblies may require adjustment to the asset A sub-assembly. If the changes made by the asset B design team are uploaded to the enterprise resource planning database 320, then the related changes to asset A reflected in bill of materials 300 and 301 will be captured by regular imaging of those portions of the enterprise resource planning database.

Regardless of imaging frequency or other aspects of the source of the enterprise resource planning dataset, once appropriate data regarding manufacturing asset A is obtained, asset definition document 330 is generated and then placed into designer queue 350. For instance, component management system 310 may provide an e-mail like interface for users, with tasks represented as incoming and outgoing messages. The designer may be alerted that a new task is ready, namely updating asset definition document 330 for the manufacturing asset A project.

The designer can access asset definition document 330 in any suitable manner. For instance, in some embodiments, asset definition document 330 can comprise a spreadsheet. The spreadsheet may be formatted for use in any number of commercially-available software applications. Alternatively, component management system 310 may provide functionality whereby documents such as spreadsheets can be viewed, modified, and saved. Asset definition document 330 can, of course, comprise any suitable format other than a spreadsheet.

The designer can provide data updating the component stocking requirements for manufacturing asset A in any suitable manner, with updating shown generally at arrow 411. For instance, the designer may manually input changes to the spreadsheet or may copy and paste changes from other documents or applications. Additionally or alternatively, the designer may export data from other documents or applications. As another example, the designer may provide data by indicating selection of one or more alternatives provided by the document, such as by selecting check boxes (or other indicators), selecting one or more options from pull-down menus, and the like.

For example, asset definition document 330 may comprise a list of parts, sub-assemblies, and tools used to construct and maintain sub-assembly "A" in normal operation. As part of a design change, some parts requirements may change. For instance, if sub-assembly "A" is being adapted to process a different material, some parts suitable for handling the old material may require adaptation or replacement by parts for handling the new material. For example, assume sub-assembly A is used to cut material in a diaper-making machine. If the design change results in a more robust material to be cut (such as a stronger and thicker material), numerous components such as blades, actuators, and the like may need to be replaced to handle the stronger and thicker material in a proper manner.

The designer may additionally or alternatively specify stocking requirements. For instance, the design change may result in a requirement to stock a currently-unstocked component, or may result in a change in the number of a currently-stocked component. Furthermore, in some embodiments, the design change(s) are each associated with one or more effective dates. For example, each component stocking requirement can have an effective date of implementation. Implementation and other temporal data can be used by the component management system in generating forecasts and other documents.

Based on the design changes, the designer can alter the list of parts in asset definition document 330. For example, the designer may remove the current cutting blade and actuators and substitute parts that are rated for handling the new material. This information may be provided in any suitable manner. For instance, parts specification data 306' may be accessed by the designer for purposes such as using the correct terminology and/or to directly import data such as component numbers and the like. Once the designer has made the desired changes, the designer can update asset definition document 330, such as by selecting a "save" option. Once the designer is fully satisfied with the asset definition document as updated, the designer can release the document to the next queue for review as shown at arrows 412 and 414. In FIG. 2, the asset definition document as modified by the designer is represented at 331.

As mentioned above, the arrangement of queues and flow of documents from queue to queue will vary depending on the needs and structure of the enterprise. Data regarding queue structure and document flow can be specified to component management system 310 as part of defining a project. Additionally or alternatively, aspects of queue structure and document flow may be defined as applicable across multiple projects and/or system wide.

Returning briefly to the designer, in some embodiments, the asset definition document 330 may support one or more stocking designators. For example, a checkbox or other indicator can be included alongside each part (or other component) to indicate whether the part (or other component) is to be stocked by the enterprise. Design changes that result in a requirement for a part that is not stocked at the time of the design change can represent a significant challenge to effective parts management. For instance, the decision whether to stock a part must typically be approved by one or more persons other than the designer and action must be taken in a timely manner to ensure that adequate supplies of the part are on hand when the design change is to become active. Specifically, in this example, the authority to stock document must be approved by the designer, supervisor I-A, and supervisor 2. Therefore, in some embodiments, the component management system monitors asset definition documents for the addition of currently-unstocked components.

For example, the component management system may monitor data indicating whether parts in asset definition document 330 are indicated as "to be stocked." If such an indicator is "TRUE," then the component management system may evaluate whether the part is currently stocked. For instance, parts data 306' (and/or stocking requirements 301' or other data) may identify which parts are stocked by the enterprise and which parts are not stocked. In some embodiments, if design changes are handled at a plant level, the checkbox may indicate whether a component is to be stocked by the plant. Parts data 306' may indicate not only whether the component is stocked, but also which plant(s) stock the component. In any event, if a design change results in a requirement for a part that is not currently stocked at a location where it is not currently stocked, then the component management system can generate an authority to stock document 340 as shown at arrow 424.

In FIG. 2, authority to stock document 340 is generated based on parts data 306'. For instance, the designer may have specified a cutting blade that is known to the system (in the sense that parts data 306' comprises information about the part), but not stocked at the designer's facility. Although the designer may manually generate one or more authority to stock documents, this task may be made easier by automatic generation by the component management system. For instance, the designer may designate use of the blade component in manufacturing asset A and indicate that it is to be stocked at the plant. Based on the part designation (and determination that it is not currently stocked), the component management system may generate authority to stock document 340 and populate the document with required information. This information may include, for example, the part number and other identifiers, source information, use information, ordering information, and the like. In some embodiments, as part of generating the authority to stock document, the component management system may determine the required timing for approval of the authority to stock document and ordering of the part based on the effective date of the design change. Based on this information, authority to stock documents may be prioritized in the designer and supervisory queues to ensure that authority to stock documents are considered in an optimal timeframe.

As shown at 426 in FIG. 2, authority to stock document 340 may be placed in designer queue 350 and the designer (or other personnel) may make changes or additions to the generated document. Once those changes are finalized, the designer may release the authority to stock document to the next queue as shown at 428 and 433. In this example, the authority to stock document as released is indicated at 341. For instance, the component management system may merge a manually-entered authority to stock document for other parts into the automatically-generated authority to stock document. Authority to stock document 341 is then placed into supervisory queue 354 for review by supervisor I-A. As an example, supervisor I-A may be responsible for reviewing the stocking decision from a parts management perspective to ensure that proper terminology and ordering times have been specified.

Supervisor I-A may approve authority to stock 341, modify and release authority to stock 341, or reject authority to stock 341. For instance, if authority to stock 341 is rejected, it may be returned to designer queue 350 a shown by arrow 431. However, if authority to stock 341 is approved (or is modified and then approved), then it may be provided to queue 356 for review by supervisor 2 as shown by arrows 432 and 434. In FIG. 2, the version of the authority to stock as released by supervisor I-A is illustrated at 342 for purposes of clarity. This example will return to supervisor 2 further below, but now returns to asset definition document 331.

In this example, asset definition document 331, representing component stocking requirements for asset A as modified by the designer, is placed in queue 352 for review by supervisor I. For example, supervisor I may represent a plant manager responsible for checking the designer's work, ensuring parts compatibility, and verifying that designs meet the enterprises' standards. For instance, the enterprise may mandate that the same type of cutting blades be used for the same types of applications. If the designer specified, for instance, an adequate blade but not the preferred blade, supervisor I may change the design. For example, supervisor I may access asset definition document 331 and change the specified cutting blade. Alternatively or additionally, supervisor I may return the asset definition document to the designer for verification or for the designer to implement the change. If asset definition document 331 is rejected, it is returned to designer queue 350 as shown by arrows 413 and 415. However, if supervisor I approves the asset definition document, then it is placed in queue 356 for review by supervisor 2 as shown by arrows 418 and 420. In FIG. 2, the version of the asset definition document that is placed in queue 356 is shown as ADD 332.

In some instances, supervisors such as supervisor I may make changes to an asset definition document that can require approval from personnel in the parts stocking decisions chain (such as supervisor I-A). For example, if supervisor I changes the asset definition document so as to require a preferred blade and the preferred blade is currently stocked by the enterprise, then no authority to stock document would be necessary. In such a case, activity regarding authority to stock 341 (or authority to stock 342 if the document had already left queue 354), can be suspended pending a final decision on the component. As another example, supervisor I may change asset definition document 331 so as to require stocking of an additional unstocked part. For example, supervisor I may add another unstocked part. The changes may trigger generation of a new authority to stock document. However, in some embodiments, the changes may be reflected in an existing document, such as authority to stock document 341.

Generally, the component management system can be configured in some embodiments to associate one or more asset definition documents with one or more authority to stock documents. Thus, if a change is made in an asset definition document, the system can identify one or more related authority to stock documents, and vice-versa. Changes in one document can be automatically reflected in the other corresponding document(s). Additionally, changes can result in removal of one or more documents from a queue, transfer of one or more documents to another queue, and/or re-ordering of documents in a queue to reflect changed priorities.

Supervisor 2 in this example has a dual role in approving both authority to stock documents, such as authority to stock document 342, as well as asset definition documents such as asset definition document 332. For example, supervisor 2 may be responsible for parts planning at the enterprise or plant level. Supervisor 2 (and/or other supervisors) may have limited authority regarding changes to the asset definition document and/or authority to stock document. For example, supervisor 2 may be limited to approving or rejecting asset definition documents, or may be limited to certain types of changes, such as adjusting quantities in stocking requirements.

In this example, supervisor 2 also is ultimately responsible for finalizing changes to component requirements and authority to stock documents. Thus, once supervisor 2 indicates approval (shown at arrow 422) of an asset definition document (with the final version indicated as 333 in FIG. 2), the changes to component stocking requirements defined therein are uploaded to enterprise resource planning database 320 (shown at arrow 444). For instance, the changed component list and stocking requirements for manufacturing asset A can be exported from asset definition document 333 into appropriate locations so as to modify bill of materials 300 and stocking requirements 301. Additionally, data from the approved authority to stock document (shown at 343 in FIG. 2) can be uploaded to appropriate portions of enterprise resource planning database 320, as shown at arrow 446. For instance, an enterprise resource planning database may comprise data regarding the parts approval process, such as verifications that appropriate personnel have "signed off" on the acquisition. For example, such information may be included or associated with each part identified in parts data 306.

In some embodiments, once data has been uploaded to enterprise resource planning database 320, then versions of authority to stock, asset definition document, and other documents are archived in component management system database 313. The archiving is indicated by arrows 440 and 442. Of course, asset definition documents, authority to stock documents, and other component management system data may be archived at other times, regular intervals, and/or irregular intervals.

Although the example above generally discussed the effects of design changes to a single manufacturing asset, it will be apparent that multiple design changes across multiple assets may be tracked by the component management system. For instance, at any given facility, multiple designers may be addressing projects across varied timelines, with the design changes potentially greatly affecting the parts stocking requirements for the facility. Each designer, supervisor, and/or other queue may comprise documents relating to multiple different projects. At a larger level, an enterprise's overall parts requirements (and associated financial and regulatory obligations regarding parts status) may reflect changes ongoing across a plurality of different facilities. By using a component management system in accordance with the present subject matter, the enterprise may be able to make proactive component stocking decisions at the plant level and/or at the enterprise level.

For instance, in some embodiments, the component management system supports generation of component demand forecasts based on tracking ongoing changes to parts requirements during the design process. For instance, one or more asset definition documents may be in various stages of progress through queues associated with a given facility. Using the illustration of FIG. 2, for example, a first asset definition document may be in a designer's queue undergoing changes to asset A. Changes related to a redesign of asset B may be at an intermediate level, while changes to the design of asset C may be nearly ready for implementation and undergoing final approval. Each set of changes can impact the facility's component stocking needs based on the effective date of the changes. For instance, although in this example changes to asset A are in the initial stages, the effective date of those changes may be sooner in time than the effective date of changes to asset C. Design changes to asset C may correspond to, for example, accommodating seasonal changes in a product line while design changes to asset A correspond to an unexpected event, such as a redesign of a machine related to a regulatory mandate. Thus, not only will the overall parts requirement for the facility change in the future, the timing of the changes may require differing degrees of responses.

Therefore, in some embodiments, the component management system can generate an component demand forecast that can be based on data comprising the current installed base (with "current" corresponding to the date of the forecast), the asset definition documents, and the effective date of the design changes specified in the asset definition documents. For example, in some embodiments, on a regular basis, the components requirements specified in asset definition documents that are in-process can be compared to reference data, such as the current installed base for the components, in order to determine a simulation of the installed base for the components at one or more points in the future.

As an example, a first design change, such as bringing an identical copy of a current machine online, may result in an increased number of a currently-stocked part. A second design change may result in discontinuing use of a currently-stocked part, while a third design change may introduce a previously-unstocked part. The component demand forecast can be used by management and other personnel to determine what parts will need to be ordered and the date when such parts are to be ordered.

For instance, the forecast may indicate that (due to the second design change) the currently-stocked part will no longer be used in thirty days. If the facility uses two parts per day and has seventy parts in stock, then the personnel can determine that the part does not need to be ordered. The forecast may indicate that (due to the first design change) the number of the currently-stocked part will need to be doubled. Depending on the date of the first design change and lead time for the currently-stocked part, the personnel may need to take varying types of action. As an example, if the effective date is far enough in the future so that the required number can be made available using standard delivery, the parts management personnel can avoid incurring extra expenses for rush delivery. The forecast, however, may indicate that effective date of use for the currently-unstocked part is such that the current date is within the lead time for obtaining the currently-unstocked part using regular delivery. That is, if the part were ordered using standard delivery, it would not be delivered in time. Depending, of course, on the nature of the part, though, expedited delivery may be an option, and the parts management personnel can be alerted to consider expedited delivery or inform other parties about the potential problem ahead of time.

In some embodiments, the component demand forecast can be generated so that different component requirements are annotated based on time concerns such as those discussed in the examples above. For instance, if a component needs to be stocked or ordered within a certain number of days, weeks, or months of the date the forecast document is generated in order to implement a change on time, the component may be highlighted. For example, if a component needs to be ordered within fourteen days from the date of the forecast document, the component may be highlighted in yellow. As another example, if the simulation indicates that a component should have been ordered at a date prior to the date the component stocking forecast document is generated, then the component may be highlighted in red. Other colors and/or types of annotations may be used, of course. Information used to determine the timing of ordering, delivery, lead times, and the like may be obtained by querying the enterprise resource planning dataset which may, for example, include lead times and/or recommended ordering strategies for parts.

Turning now to FIGS. 3 through 8, exemplary process steps will now be discussed. Although particular steps are presented in the examples below, the order of the steps may be varied, steps may be separated into sub-steps or combined, and, unless otherwise noted, the order of steps can be varied and/or steps can be performed in parallel. Such steps may be implemented by one or more component management system software tools, applications, processes, or modules. In some embodiments, some steps may be implemented using the component management system, while other steps are implemented using other systems or applications associated with the component management system. Of course, any suitable computing device or devices may be used to implement embodiments of the present subject matter. Moreover, the computing devices may be adapted to function by hardware, software, or combinations of hardware and software.

Figure 3:
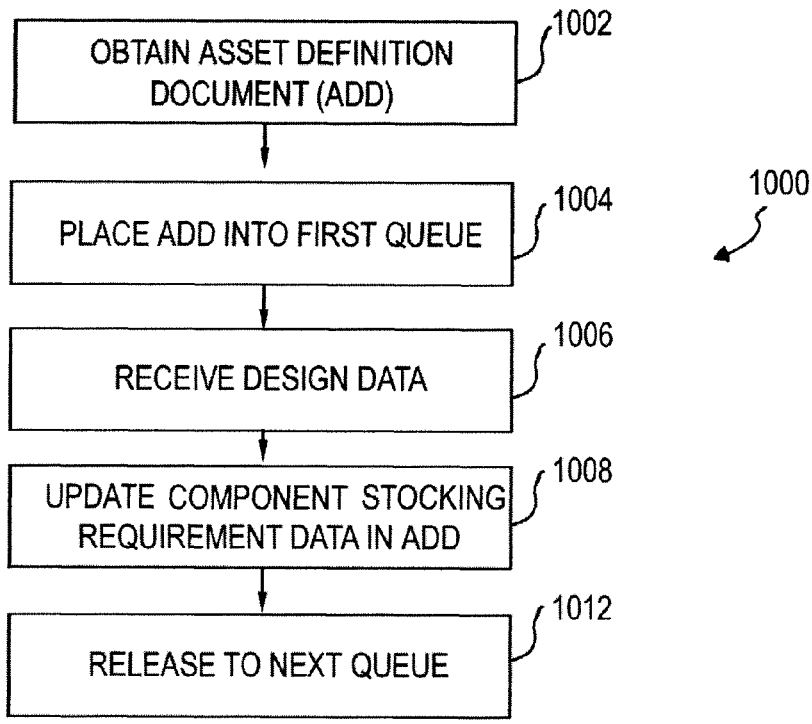
FIG. 3 is a flowchart showing steps in an exemplary workflow at a queue, such as at a designer queue.

FIG. 3 is a flowchart showing steps in an exemplary workflow 1000 at a queue, such as at a designer queue. At step 1002, a document, such as an asset definition document, is obtained. For example, the component management system may generate one or more asset definition documents based on asset definitions in a project. The asset definition document may be generated at any suitable time, such as when the project is defined or sometime later. For instance, a project may be defined at a first date, but work may not begin until a later date. In some embodiments, the asset definition documents may be generated at the later date or generated earlier and updated at the later date. In other embodiments, the asset definition document may be obtained from another queue. For example, the asset definition document obtained at 1002 may comprise a revised or rejected asset definition document received from another user, such as a manager or supervisor of the designer or other user(s) of the queue. In any event, the asset definition document may then be placed into one or more queues associated with a project, such as designer queues, as shown at 1004. Then, at 1006, design data is received.

For example, the design data may comprise a change to a list of components used in or with a manufacturing asset, such as an addition, deletion, and/or substitution of a component. As another example, the design data may comprise a change to a stocking requirement for one or more components. For instance, a machine or other asset may be redesigned to require a larger or smaller number of a given component to be maintained in inventory based on operational or inventory planning concerns. Data may be received in any number or combination of ways. For example, the designer or other user(s) of the queue may manually change entries in the asset definition document, such as by typing, selecting from predetermined choices, or otherwise inputting data. As another example, data may be exported from another application or hardware device, with the data imported into the asset definition document.

At 1008, one or more component stocking requirements are updated based on the received data. For example, in embodiments in which the asset definition document is maintained as a spreadsheet, a version of the spreadsheet as updated may be saved. The component management system may save one or more versions or copies of an asset definition document in order to track design changes and to provide for data retention. At 1012, the asset definition document is released to the next queue or queues. For example, if the design change is occurring as part of a project that defines queue paths, the asset definition document may be released to the queue set forth in the project definition data. For instance, the designer(s) may release the asset definition document for review by one or more supervisors. However, the next queue need not be explicitly defined. For example, in some embodiments, the designer(s) or other users can select the queue(s) that receive the document next, such as by selecting the queue(s) from a drop-down or other list and/or by typing in a queue or user identifier.

Although in the examples above, the queue workflow was discussed in the context of an asset definition document, the same principles of operation can be applied to an authority to stock document. For instance, initially, the authority to stock document can be obtained. As an example, one or more authority to stock documents may be generated by the component management system upon detection of a design change that adds a stocking requirement for a currently-unstocked component. The currently-unstocked component may be a component that is entirely new to the system (in that it has never been stocked before) or may be a component that was previously stocked, but is not stocked at the time of the design change. The designer or other queue user(s) can input data to the authority to stock document(s), such as specifying preferred supplier, ordering time, delivery requirements, stocking location, and the like. IF the component is known to the system, some of the data included in the authority to stock document may be obtained from an enterprise resource planning data set. For instance, in some embodiments, the component management system supports importing data for authority to stock documents automatically, either upon generation of an authority to stock document based on the component(s) listed therein or based on an input (such as an "import" command) from a user. The authority to stock document(s) can then be released to one or more other queues for approval. Some or all of the queues involved in approval of authority to stock documents may overlap with queues involved in approval of asset definition documents in some embodiments; in other embodiments, the queue paths may be partially or entirely distinct.

When a designer (or other queue user) approves an authority to stock document (or other document), the approval may be tracked in order to establish a chain of approval required by the enterprise. For example, rather than requiring personnel to physically "sign off" on versions of asset definition documents, authority to stock documents, and/or other documents, the approval or release of a document from a queue may be treated as an equivalent to a physical signature.

Figure 4:
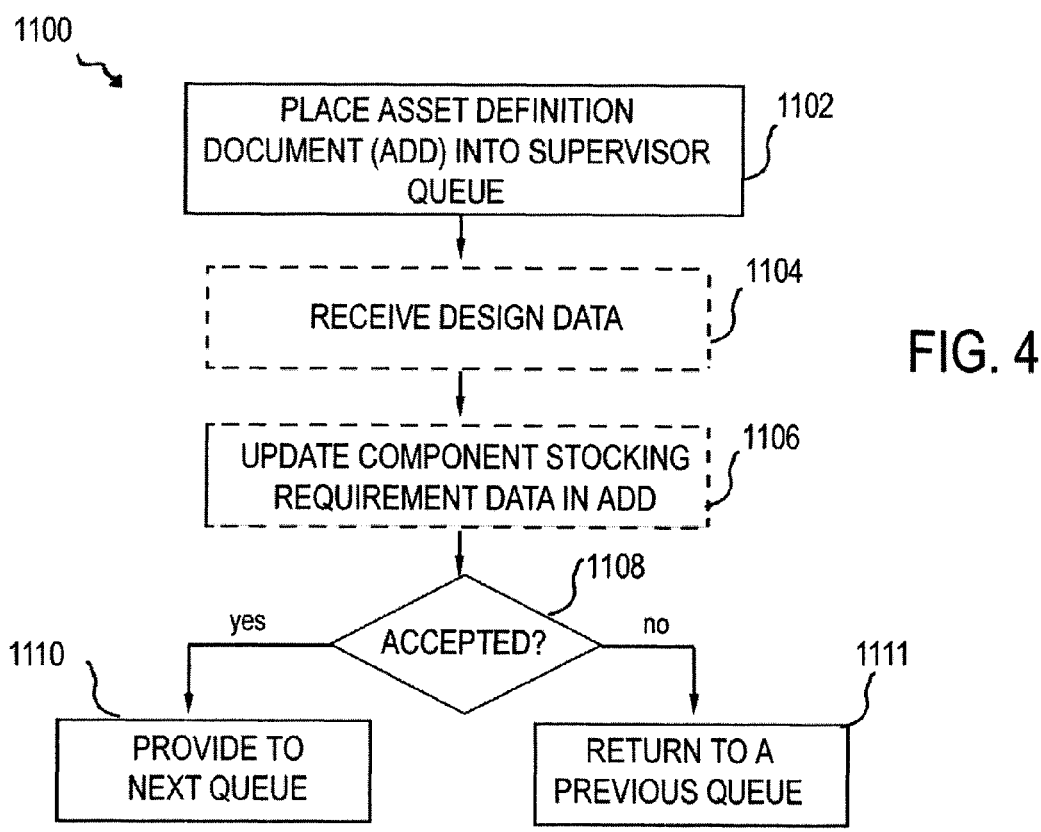
FIG. 4 is a flowchart showing steps in an exemplary workflow at a queue, such as at a supervisor queue.

FIG. 4 is a flowchart showing steps in an exemplary workflow 1100 at a queue, such as at a supervisor queue. At 1102, an asset definition document is placed in the supervisor queue. For instance, the asset definition document may have been released by one or more designers that report to the supervisor. As another example, the asset definition document may have been returned to the supervisor by a still-higher level of management, for example, for revisions or confirmation of changes. At 1104 and 1106, the process comprises receiving design data and updating one or more component stocking requirements in the asset definition document. These steps are shown in dashed boxes since they are not always necessarily performed. For example, one or more supervisors may simply review a received document and then approve or reject the document without changes. Another consideration is that not all supervisors (or other queue users) may have the ability to alter documents. For example, depending on a particular user's role in an enterprise and the type of documents in the user's queue, the user may be restricted from altering some or all of certain documents. As an example, some supervisory users may be restricted to only altering the number of components specified for stocking in an asset definition document, without the authority to change a component. Such restrictions may be implemented in any appropriate manner. For example, documents may support permissions on a field-by-field (or other basis) depending upon the identity of a user, with the identity determined based on which queue the document is in. As another example, certain types of changes may be rejected by the component management system based on the queue in which a document is located.

At step 1108, data is received indicating whether the document is approved. If the document is approved, then at step 1110, it is provided to the next queue. As noted above, the destination queue(s) may be pre-defined or selected by the user. At step 1111, if the document is not approved, then it is returned to a previous queue. For example, the supervisor may return an asset definition document or an authority to stock document to a designer. As another example, the supervisor may return a document to an intermediate user queue lying between the supervisor and the designer. The document may be returned as originally received or may be returned with changes made by the supervisor.

As was noted above with regard to FIG. 3, the same operational principles can be applied to the handling of authority to stock documents. Namely, a supervisor in an authority to stock approval chain can adjust the contents of an authority to stock document if needed and approve or reject the document.

Figure 5:
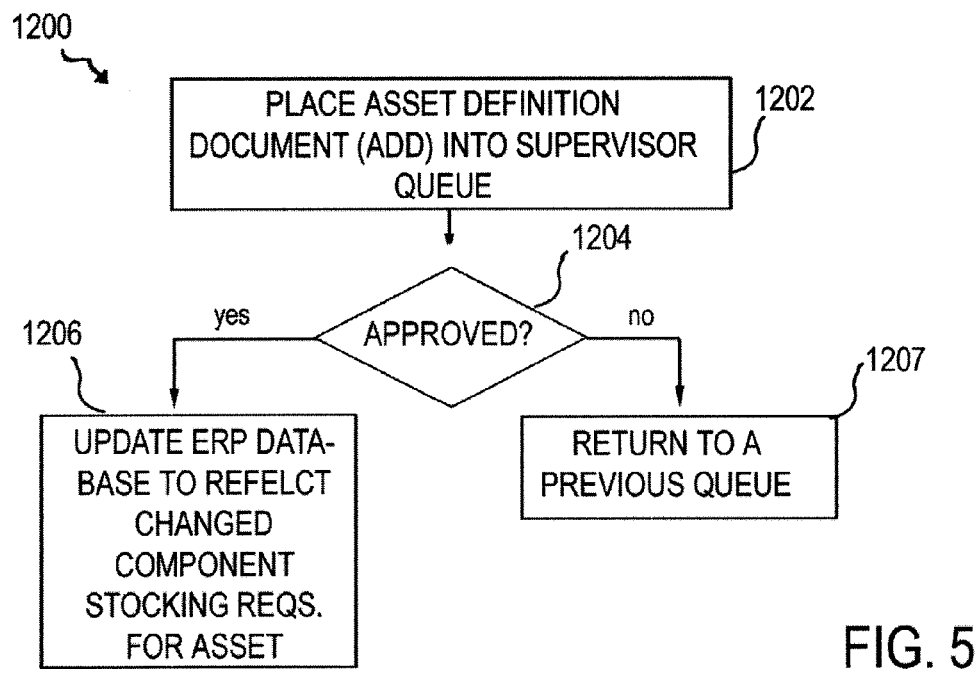
FIG. 5 is a flowchart showing steps in an exemplary workflow at a queue, such as at a supervisor queue with final approval authority.

FIG. 5 is a flowchart showing steps in an exemplary workflow at a 1200 queue, such as at a supervisor or other user queue with final approval authority. At 1202, the asset definition document is placed into the queue. For instance, the document may have traversed several queues, with the supervisor queue of this example representing the final phase in the approval process. At step 1204, information is received indicating whether the document is approved. In this example, the supervisor is limited to approval or rejection of the document, although in other embodiments, the supervisor(s) with final approval authority may also have limited or full authority to make changes, depending on the structure of the enterprise. At 1207, if the document is not approved, it is returned to a previous queue. The document may be returned to the originator (such as a designer queue) or an intermediate queue (if any) for changes.

At 1206, if the document is approved, then the enterprise resource planning database is updated to reflect the changed component stocking requirements (and/or other data) for the asset. Even if a component management system uses an enterprise resource planning dataset (e.g. one or more images from SAP or other system(s)), once approval is finalized, the "live" database, and not just the image(s) thereof, can be updated. The image(s) may or may not be updated, depending on the implementation. Additionally, the update(s) may occur at the time of final approval, or all final approvals may be uploaded in a batch updating process.

For example, if an asset definition document is approved, the changes in required components may be exported to change the bills of materials, component stocking requirements, and other data in the enterprise resource planning system. The update may also include an effective date for the changes if the changes are not immediate. If an authority to stock document is approved, the updates to the enterprise resource planning database can comprise, for example, any added component data (such as supplier information for an entirely new component), changes to component data, and data indicating that the approval process was followed (e.g. proof of approval by the required personnel). In some embodiments, when the enterprise resource planning database is updated, the asset definition documents, authority to stock documents, and other data associated with a design change are also archived in the data maintained by the component management system.

Figure 6:
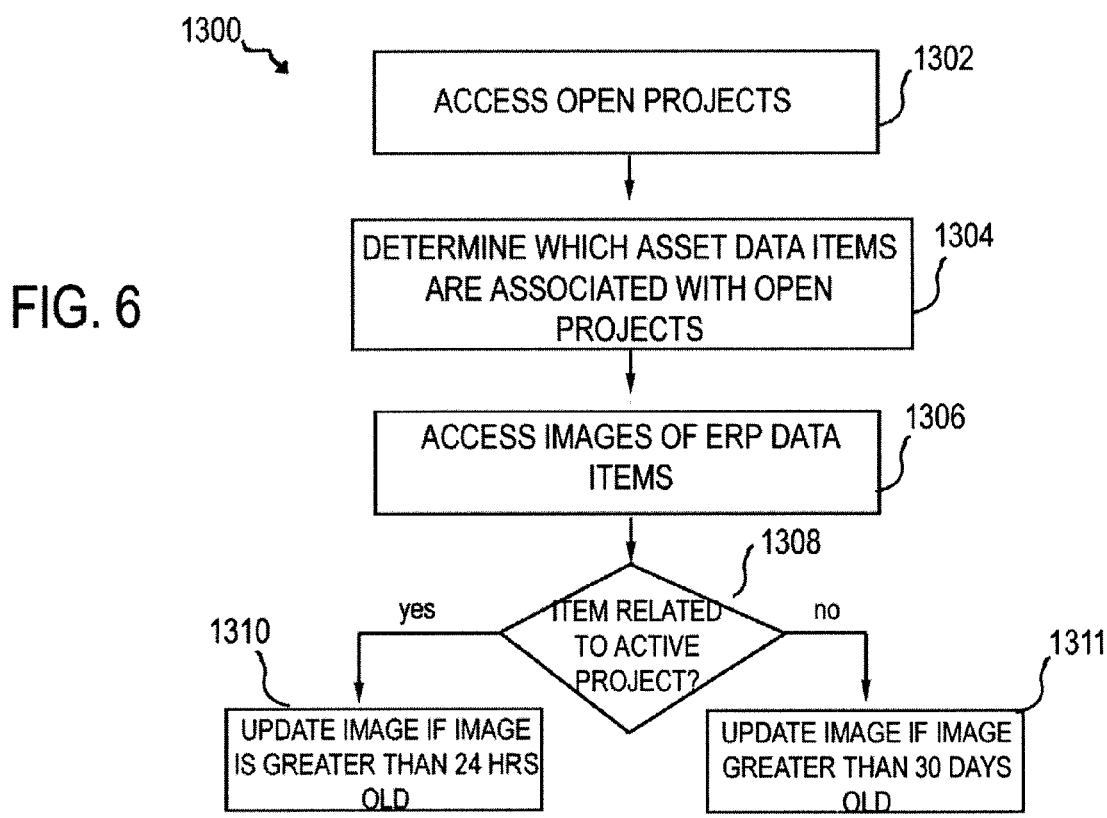
FIG. 6 is a flowchart showing steps in an exemplary process for imaging portions of an enterprise resource planning system dataset.

FIG. 6 is a flowchart showing steps in an exemplary process 1300 for imaging portions of an enterprise resource planning system dataset. As is the case with all examples herein, the particular steps and processes shown are for purposes of example only. In this example, the enterprise resource planning system is imaged based on whether portions thereof are the subject of one or more active design projects. As was noted earlier, use of an enterprise resource planning dataset may reduce workload and system overhead for the enterprise resource planning system. Once design changes are finalized, the actual enterprise resource planning system can be updated.

At 1302, the component management system accesses data defining open projects. For instance, each project may include data indicating which manufacturing assets are the subject of design changes, with the "active" status depending on, for example, proposed date for the design process to begin. At 1304, the system determines which asset data items are associated with open projects. For example, a particular manufacturing asset may be specified in a project.

At 1304, the system determines which data items in the enterprise resource planning system are associated with open projects by correlating data items to manufacturing assets that have been determined to be the subject of one or more projects. The data items may be identified directly or indirectly. For some data items, such as bills of materials, the asset may be explicitly identified. For example, if the project identifies "Manufacturing Asset A", the data items of interest can comprise "Manufacturing Asset A" bills of materials, stocking requirements, and the like. Other data items not specifically identified or associated with a particular asset (such as parts supplier and ordering data organized on a part-by-part basis), may be determined as associated with an open project by cross-referencing other data. For example, the "Manufacturing Asset A" bill of materials may list components by component number or other identifiers. Part supplier and ordering data for the listed components may be thus identified as associated with an active project by cross-referencing the bill of materials.

At 1306, the system access one or more images of the enterprise resource planning system data items. For example, if the component management system already maintains an image of some portions of the enterprise resource planning system data, the currently-maintained images may be evaluated for "freshness." In this example, each imaged data item is evaluated at 1308. As shown at 1310, if a data item is related to or associated with an active project, the image of the data item is updated if the image is more than 24 hours old. As shown at 1311, if an image of a data item is not related to or associated with an active project, then it is updated only if the image is greater than 30 days old. The use of 24 hours and 30 days as benchmarks for updating images is for purposes of example only. Other time intervals, whether longer or shorter may be suitable in other embodiments. In some embodiments, complete absence of the image of a data item image can be treated as requiring an "update" of an image.

The actual imaging process can be implemented in any suitable manner. For example, in some embodiments, the component management system evaluates its current imaged data items (if any) and determines a list of required data item images. Then, the data item images can be obtained in a batch process (for example, nightly), when the enterprise resource planning system usage level is low. Of course, other times or intervals for batch imaging are suitable. Additionally, batch imaging is not required in all embodiments.

Figure 7:
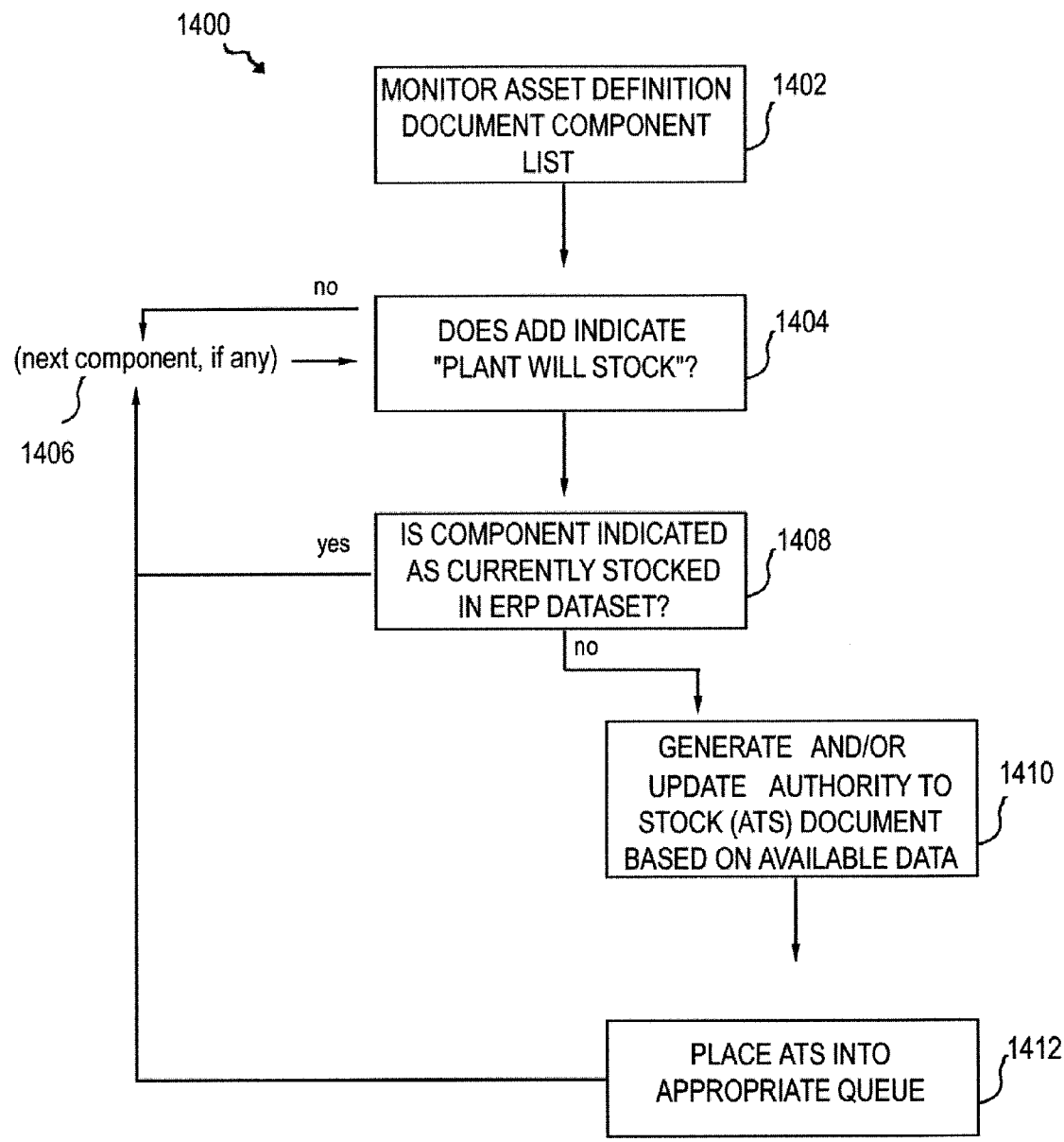
FIG. 7 is a flowchart showing steps in an exemplary process for generating and/or updating authority to stock documents.

FIG. 7 is a flowchart showing steps in an exemplary process 1400 for generating and/or updating authority to stock documents. At 1402, one or more documents, such as asset definition documents, are monitored by the component management system. For instance, the component management system may access all active asset definition documents on a regular or irregular basis and review status indicators associated with components therein. Alternatively, the component management system may support triggering functionality whereby the component management system is alerted to certain types of activity or changes to asset definition documents. The following steps indicate activity with regard to evaluating stocking decisions on a component-by-component basis. The components evaluated may be included in a single asset definition document or may be included in multiple asset definition documents.

At 1404, the system determines whether an asset definition document (labeled as "ADD" in FIG. 7) indicates "plant will stock" for one or more components. For example, each entry for a component in an asset definition document may include a checkbox or other indicator that a designer (or other user) can adjust to indicate whether a plant will stock a component. Although in this example the stocking decision is made at a plant level, the stocking decision may relate to other levels of the enterprise. The checkbox may be used by the component management system to determine whether an authority to stock document needs to be generated for the component. For example, as noted above, the component management system may scan authority to stock documents to determine which components are flagged as stocked by a plant. As another example, by selecting the check box (or other indicator) a message or other trigger identifying the component and stocking status may be provided to the component management system.

At 1406, if the component is not indicated as one to be stocked by the plant, then the process loops back to evaluation of the next component in the asset definition document (if any) and/or to evaluation of components in other asset definition documents.

If a component is indicated as one to be stocked, then at 1408 the process next evaluates whether the component is already stocked. For instance, parts (or other) data from the enterprise resource planning dataset can indicate which components are stocked at a plant. If a component is already stocked, then an authority to stock document is not needed in some embodiments and is therefore not generated in this example. For instance, the design change may require an adjustment in the number of components that are stocked, but such adjustments may be handled in the approval process for the asset definition document(s) associated with the change.

However, if the part is not currently stocked, then authority to stock approval may be needed and at 1410 an authority to stock document is generated or updated. For example, one or more authority to stock documents associated with the asset definition document may already exist. For instance, a designer may have begun manually preparing an authority to stock document for other components. Since, in some embodiments, each authority to stock document is associated with an asset definition document, the component management system can update the contents of the authority to stock document. As was noted above, whether an authority to stock document is generated or updated, data in the document can be obtained from the enterprise resource planning dataset. For example, parts ordering, supply, use, and technical information that is required content in the authority to stock document may be automatically placed into the generated (or updated) document. The content requirements of the authority to stock document will vary according to the procedures and policies of the enterprise. At 1412, the authority to stock document (labeled as ATS in FIG. 7) is placed into the appropriate queue.

The queue(s) that receive the ATS may vary. For example, if an asset definition document is in a designer queue, the corresponding ATS may be placed in the designer's queue as well. However, a design change may result in an update to an ATS in a different queue. For example, a first supervisor may be responsible for reviewing an asset definition document, while a second supervisor may be responsible for reviewing an authority to stock document associated with the asset definition document. For instance, the first supervisor may add a parts requirement that was not present in the asset definition document when released by the designer. The designer may have already released an authority to stock document associated with the design change to the second supervisor. The component management system may update the currently-existing authority to stock document and place it in the second supervisor's queue. In some embodiments, documents can be "pulled back" from a first user's queue by another user and/or by the system at any point prior to release by the first user. Thus, the ATS document may be "pulled back" to the designer. Alternatively, if no authority to stock document was associated with the change as originally implemented, then a newly-generated authority to stock document may be placed in the designer's queue. As a still further example, the first supervisor may make a change to the asset definition document that eliminates a requirement for a currently-unstocked part. In such a case, no authority to stock document for that part would be needed. Thus, the existing authority to stock document could be removed from the second supervisor's queue or the ATS document could be updated to remove portions thereof that relate to the deleted part.

Figure 8:
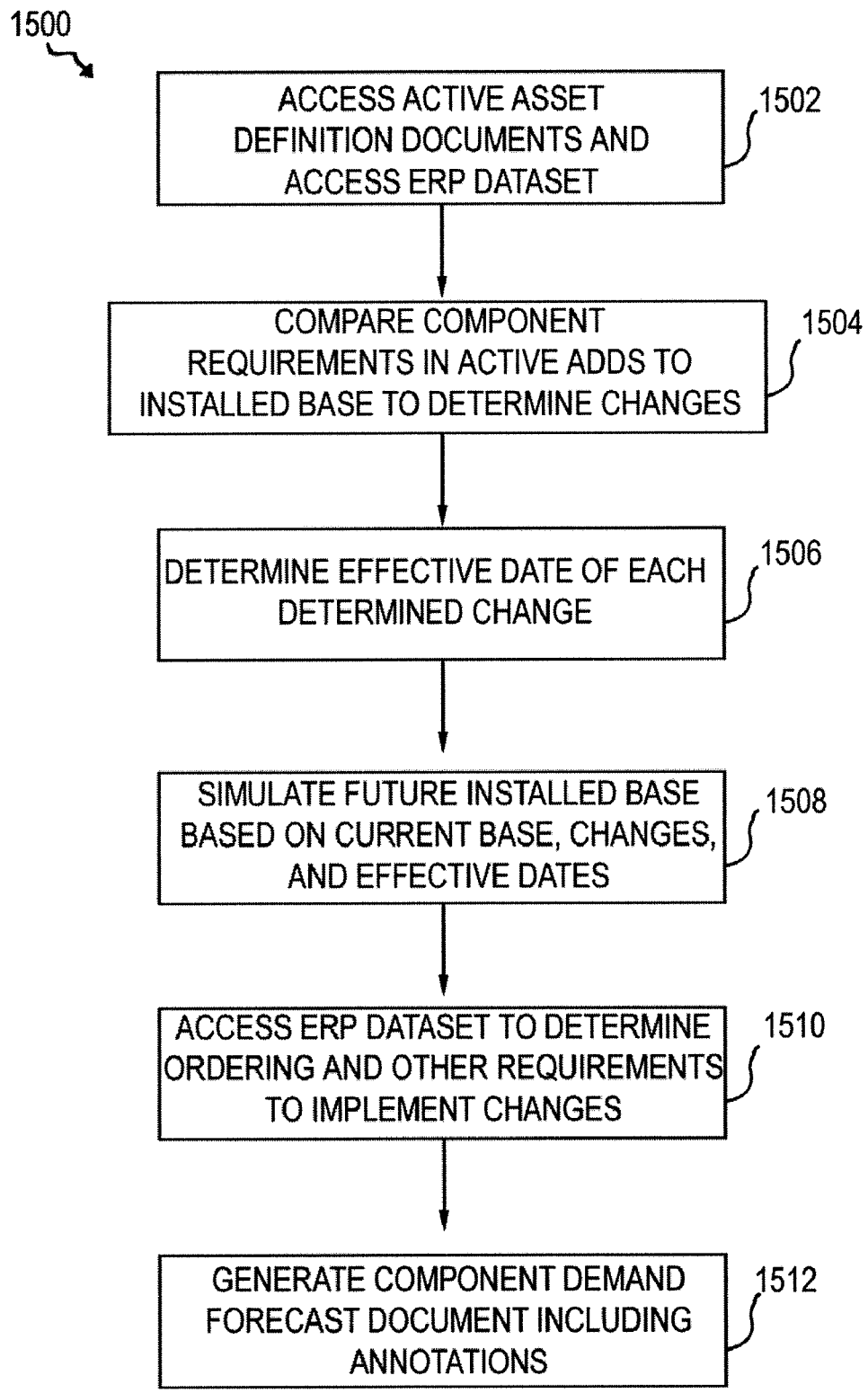
FIG. 8 is a flowchart showing steps in an exemplary process for generating a component demand forecast document.

FIG. 8 is a flowchart showing steps in an exemplary process 1500 for generating a component demand forecast document. In this example, an installed base forecast can be generated for a particular plant. However component demand forecasting can be applied to other levels of the enterprise. For example, in other embodiments, a multi-plant or enterprise-wide installed base forecast can be generated, either directly from component management system data and/or by aggregating installed base forecasts from multiple plants.

At 1502, the component management system accesses active asset definition documents and the enterprise resource planning system dataset. At 1504, the component requirements set forth in active asset definition documents are compared to currently-existing component requirements to determine which asset definition documents have introduced changes and the extent of the changes. For instance, the component requirements for each asset may be compared to the component requirements for the asset as set forth in the enterprise resource planning system dataset. As another example, the component requirements for each asset set forth in each asset definition document may be compared to the requirements in one or more previous versions of each respective asset definition document. At 1504, the effective date of each change is determined. For example, the asset definition documents may specify dates of implementation for each change. As another example, authority to stock documents may also be accessed to determine anticipated approval dates for new component stocking requirements.

At 1508, one or more simulations of a future installed base are produced, based on data including the current installed base, the determined changes to asset structures, and the effective dates of the changes. At this point, it is possible to generate a component demand forecast document, such as a report listing the parts requirements for a given facility at one or more future dates based on the design changes under current consideration. "Current" is used to denote the time that the report is generated. For example, the forecast can include a list of components currently stocked by the plant and including components stocked by the plant at one or more future dates. In some embodiments, for each component, the forecast includes the current stocking requirement for each component and the future stocking requirements. A simplified version of part of a hypothetical forecast document is shown in the table below: The layout, timeframes, part identifiers, and numbers are for purposes of illustration only.

| Component | Current Req. | 30 Days Future | 90 Days Future |
|---|---|---|---|
| Part W | 42 | 50 | 48 |
| Tool X | 13 | 0 | 11 |
| Subassembly Y | 6 | 119 | 300 |
| Part Z | 25 | 25 | 0 |

The installed base forecast may provide parts planning personnel with a great deal of useful information. For instance, in the example above, design changes in the pipeline do not significantly alter requirements for Part W apart from a slight increase. Tool X represents an interesting case that may represent an opportunity for improved parts management. Based on the "current" design changes, tool X will not be required by the plant 30 days after the date of the report (the "current date"). However, 90 days after the current date, Tool X will again be required in similar quantities. Thus, although short-term requirements indicate that tool X is not needed, it may not be optimal to sell or transfer spares of tool X. For instance, if tool X can only be disposed of at a significant loss when compared to re-stocking tool X, then the plant may advantageously decide to maintain its inventor of tool X in anticipation of the future re-requirement to stock.

The case of sub-assembly Y represents another significant event. Currently, the plant stocks only six units of Y, while in only a month the requirement will be to stock 119 units. Furthermore, in three months, the requirement will be 300 units. Based on the forecast, parts planning personnel can be prepared to implement this significant (for this example) change. Part Z, on the other hand, will not be required in three months. Based on other data, such as anticipated use and ordering times, the plant may begin the process of running-out part Z so as to deplete its inventory around 90 days from the report.

Returning to FIG. 8, in some embodiments, further steps can be taken to include additional guidance in the component forecast document. For example, at 1510, the enterprise resource planning dataset may be accessed to determine ordering, delivery, and/or other requirements to implement the changes. For example, each part may include data such as lead and delivery times. Based on this data (and/or other data), at 1512, a component demand forecast document can be generated with annotations. For instance, the forecast document may be highlighted based on the "severity" of changes in light of delivery times. For example, although only 8 additional units of part X are required, part X may have a lead time of two weeks. Thus, the 8 additional units of part X may need to be ordered within two weeks to ensure delivery by the 30-day anticipated requirement date (the actual order may vary based on current planned deliveries and usage rates for part X). Therefore, the entry for part X may be highlighted or otherwise annotated. The component management system may, for example, be configured to highlight parts in the forecast in yellow when such parts must be ordered within two weeks to meet a deadline.

Different grades of highlighting or other annotation are possible. For example, a part may be highlighted in red if the current date is within the lead time of the part. For instance, if part Y has a sixty-day lead time and none are in stock, part Y may be highlighted in red to indicate that the time for ordering part Y has already passed. Parts planning personnel may be thereby alerted that additional action needs to be taken, such as expedited ordering/delivery, contacting alternative or additional suppliers, or delaying implementation of the change.

In some embodiments, generation of a component stocking forecast document can be triggered by changes to asset definition documents and/or authority to stock documents. Additionally, an existing component stocking forecast document or documents can be updated based on changes. The triggering may be implemented as a response to certain input from designers or other personnel and/or as a response to monitoring documents in the component management system at regular or irregular intervals. In some embodiments, a new component demand forecast document is generated nightly.

Figure 9:
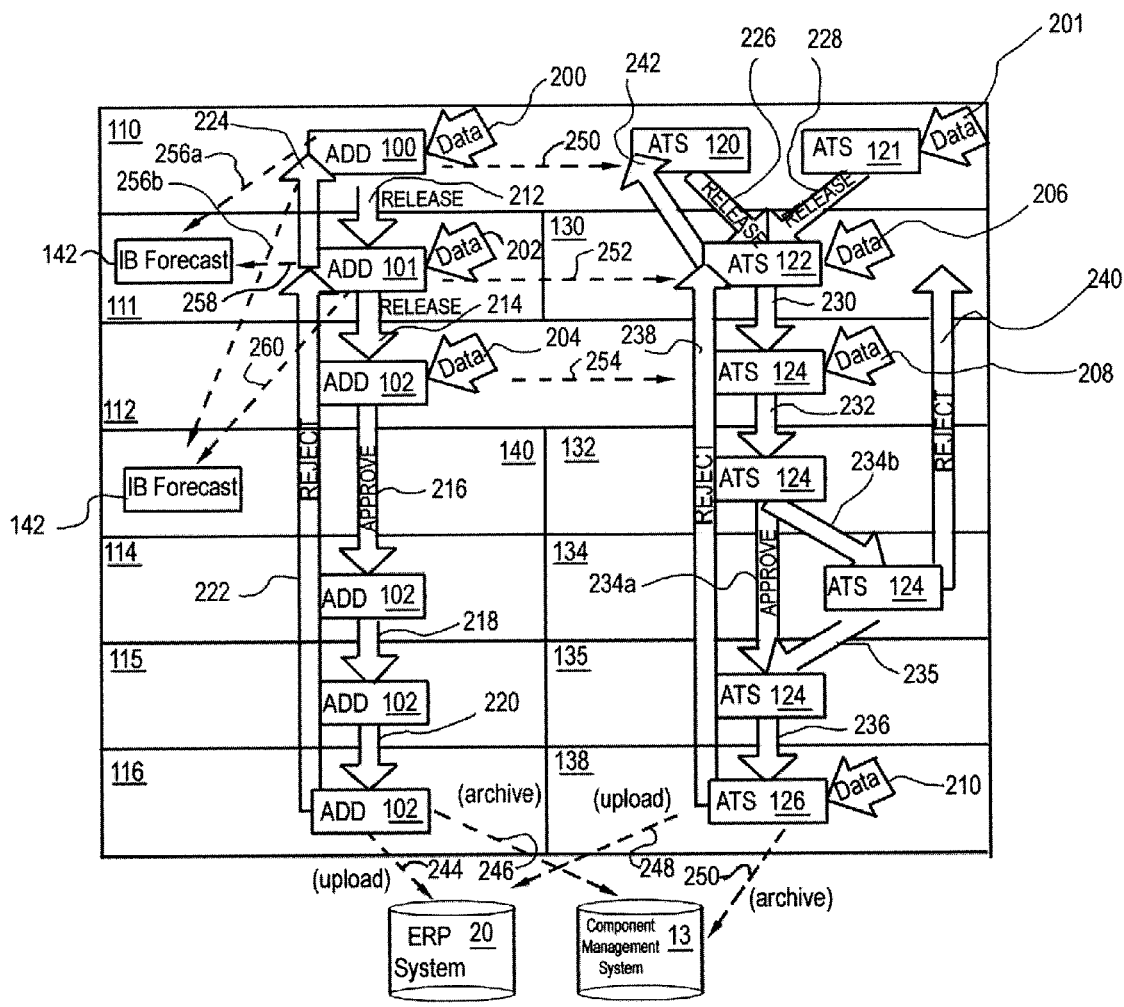
FIG. 9 is a flowchart showing exemplary structures and data flow in a component management system.

FIG. 9 is a flowchart showing exemplary structures and data flow in a component management system. This example is intended to illustrate document approval and flow amongst multiple queues. In this example, asset definition documents must pass through a first queue 110, second queue 111, third queue 112, fourth queue 114, fifth queue 115, with final approval at sixth queue 116. Authority to stock documents are originated at first queue 110 and then pass through seventh queue 130, third queue 112 (which thus has a role in the asset definition and authority to stock approval process), eighth queue 132, ninth queue 134, tenth queue 135, with final approval at eleventh queue 138. In this example a twelfth queue 140 is also shown. Twelfth queue 140 does not participate in the approval process, but does receive a component forecast document 142. For instance, users of queues 110, 111, 130, and 130 may represent personnel responsible for planning and implementing component management at a facility level. Users of queues 140, 132, 114, 134, 115, 135, 116, and 138 may represent users responsible for component management at a sector and/or enterprise level. As has been noted above, the particular queue structure will depend on policies and preferences of the enterprise with regard to implementing, tracking, and approving component requirements and stocking decisions.

In this example, an asset definition document and corresponding authority to stock document(s) can proceed in a substantially parallel fashion through the queues shown in FIG. 9, with queues related to approval of the asset definition document on the left side and queues related to approval of the authority to stock document on the right. The component management system may be configured to limit the progress of one or the other document in order to ensure that one document does not proceed too far up the approval chain as compared to the other. For instance, an asset definition document may be released from queue 111, but may not appear in the next queue until the corresponding authority to stock document has been released from parallel queue 130. Although preferable in some embodiments, such synchronization is not required.

In this example, asset definition document (ADD) 100 is placed into queue 110, which may comprise a designer queue. As shown at arrow 200, the designer(s) may add data representing changes in component stocking requirements. In this example, adding data triggers generation (or updating) of two documents. As shown by arrow 250, authority to stock document (ATS) 120 is generated (or updated), for instance, if the data provided at 200 represents an addition of a previously-unstocked part. Authority to stock document 120 is placed in queue 110. As shown at arrows 256a and 256b, the data provided at 200 can trigger generating or updating of a component demand forecast document, in this example installed base forecast 142. For example, the component management system may determine that the designer has changed how many of a particular component is to be stocked (and/or added a currently-unstocked component). In the exemplary management structure of FIG. 9, the user of queue 111 and 140 each receive a copy of installed base forecast 142.

As indicated at 212, once the user(s) of queue 110 are satisfied with ADD 100, it can be released to the next queue, queue 111, as shown at 212. The version of ADD in queue 111 is labeled as ADD 101 for clarity; it is to be understood that, at least when received, ADD 101 may comprise the same data as ADD 100. At 202, the user of queue 111 may add data. For instance, the user may specify additions, deletions, or changes to the component stocking requirements as specified in the ADD when it was received. As shown at 258 and 260, such changes may result in updates or generation of installed base forecast document 142. As shown by arrow 252, the changes may additionally or alternatively result in updates to a corresponding authority to stock document 252 in queue 130. The user of queue 111 may release ADD 101, either as originally received or as modified or may reject ADD 100 (as received or as modified) to return the ADD to queue 110 as shown by arrow 224. For example, the ADD may be returned for revision and/or approval of the changes made by the user of queue 111.

Returning to authority to stock document 120, the user of queue 110 may release the document as shown at 226. The user may also have manually prepared another ATS document 121 by inputting data 201. ATS document 121 may be released as shown at 228 to the next queue, as well. In this example, all ATS documents associated with ADD 100 are merged into a single ATS labeled as 122 in FIG. 9. In this example, the next queue for ATS purposes after queue 110 is queue 130. The user of queue 130 may make changes to ATS 122 by providing data as shown at arrow 206. As was noted above in reference to arrow 252, changes to the corresponding ADD 101 may result in updates to ATS 122. The user of queue 130 may reject ATS document 122 as shown at 242 or approve the document for consideration at the next level, as shown at 230.

In this example, queue 112 receives both asset definition documents and authority to stock documents. For purposes of illustration, these are shown as ADD 102 and ATS 124, respectively. As noted above, numbering of the ATS and ADD illustrated in this example is for purposes of clarity only. For instance, an ADD and/or ATS document may be originated at queue 110 and move through every queue without any changes. Thus, the different numbering is not intended to indicate the separate versions are required for each queue; rather, separate versions may develop based on whether changes are made.

The user of queue 112 may add data to either or both documents as shown by respective arrows 204 and 208. As was noted above, some users may be restricted as to the extent of changes they are allowed to make. For example, queue 112 may be accessed by a plant parts supervisor who is restricted to making changes in parts quantities and stocking procedures, but not technical decisions as to which part to use. ADD 102 and/or ATS 124 may be approved for further consideration as shown at arrows 216 and 232. Alternatively, either or both may be rejected and returned to their respective prior queues as shown by arrows 222 and 238.

Queues 114 and 115 may represent intermediate approval levels for asset definition document 102. For instance, a user of queue 114 may provide coordination of component stocking requirement decisions across an entire plant, while the user of queue 115 ensures coordination of component stocking requirements across a sector. Approval is indicated at arrows 218 and 220, with rejection indicated at arrow 222.

Rejection may result in ADD 102 being returned to any previous level, although in this example, it is returned to queue 111 if it is rejected at any level above queue 111.

Queue 116 may be used by a manager who has final approval over component requirement changes. For instance, if the changes in ADD 102 are approved at queue 116, the changes can be uploaded into enterprise resource planning system data store 20 as shown at 244. The changes may also be archived in component management system data store 13.

Returning to ATS 124, the user of queue 112 and release the document to the next queue, which in this example is queue 132. The user of queue 132 may approve or reject ATS 124. In this example, two different approval paths, 234a and 234b, are shown. For example, if the authority to stock document relates to a stocking decision above a specified dollar (or other cost) threshold, then approval of the user of queue 134 may be required by the enterprise. The user of queue 134 may approve ATS 124 as shown at 235 or reject ATS 124 as shown at 240. In this example, all rejections of ATS 124 from queues above queue 130 return ATS 124 to queue 130, although the document could be returned to other, intermediate queues. If, however, ATS 124 relates to a stocking decision below the threshold, then as shown at 234a, queue 134 may be bypassed. Queue 135 represents a final intermediate level, with approval indicated at 236 and rejection at 238.

Queue 138 may be used by a manager who has final approval over authority to stock decisions. As shown at 210, in this example, the manager can make changes to the authority to stock document, which is illustrated as ATS 126 for purposes of clarity. Once approved, as shown at 248, the authority to stock data is uploaded into enterprise resource planning database 20. For instance, enterprise resource database 20 may support tracking of the chain of approvals, which may be evidenced by data indicating that each of the users of queues 110, 130, 132, etc. electronically "signed off" on the document. As another example, if a new part is added to the system, then parts data collected during the approval process can be uploaded automatically into the enterprise resource planning system. This may automate a previously-tedious process since, depending on the particular enterprise resource planning system architecture and configuration, parts data may be specified in multiple different locations. As was the case of a finalized ADD, the ATS data can also be archived in component management system database 13.

It is to be understood that the examples above are for purposes of illustration only, and not of limitation. For example, the roles and identifiers for queues can vary according to the particular project, enterprise, and other circumstances, and may be fixed or variable depending upon how the component management system is configured. For instance, the designators "designer queue," "supervisor queue," and the like are not meant to limit the possible types or numbers of queues or users. Additionally, each queue may be accessible by one or more users. Furthermore, any data structures or formats may be used to manage, render, and adjust queue contents.

Component management systems and methods such as discussed in the examples herein may be used in any suitable context. For example, some embodiments of component management systems and/or methods can be used in a standalone manner. Other embodiments of component management systems and/or methods can be used alongside and/or as part of other systems and/or methods that address other aspects of parts planning, management, and the like. For instance, U.S. patent application Ser. No. 11/321,759, filed Dec. 29, 2005, entitled "Spare Parts Inventory Management," includes discussion of various exemplary aspects spare parts management. Application Ser. No. 11/321,759 is incorporated by reference herein in its entirety.

The above examples involved reference to servers, databases, software applications, and other computer-based systems and devices, as well as actions taken and information sent to and from such systems. Any possible configuration, combination, and division of tasks and functionality between and among components can be used if suitable. For instance, if a client/server architecture is used, it can implemented using a single server or multiple servers working in combination and capable of communication with one or more clients. Databases and applications may be implemented on a single system or distributed across multiple systems. Distributed components may operate sequentially or in parallel.

When data is obtained or accessed between a first and second computer system or component thereof, the actual data may travel between the systems directly or indirectly. For example, if a first computer accesses a file or data from a second computer, the access may involve one or more intermediary computers, proxies, and the like. The actual file or data may move between the computers, or one computer may provide a pointer or metafile that the second computer uses to access the actual data from a computer other than the first computer, for instance.

Network communications may also occur over any suitable network or networks including, but not limited to, dial-in network(s), a local area network(s) (LAN), wide area network(s) (WAN), public switched telephone network(s) (PSTN), the Internet, intranet or other type(s) of networks. A network may comprise any number and/or combination of hard-wired, wireless, or other communication links.

The various computer systems/computing devices discussed herein are not limited to any particular hardware architecture or configuration. Any suitable programming, scripting, or other type of language or combinations of languages may be used. Embodiments of the methods and systems set forth herein may be implemented by one or more general-purpose or customized computing devices accessing software instructions rendered in a computer-readable form. Embodiments of the methods and systems set forth herein may also be implemented by hard-wired logic or other circuitry, including, but not limited to application-specific circuits. Of course, combinations of computer-executed software and hard-wired logic may be suitable, as well.

Any suitable computer-readable medium or media may be used to implement or practice the presently-disclosed subject matter, including diskettes, drives, and other magnetic-based storage media, optical storage media, including disks (including CD-ROMS, DVD-ROMS, and variants thereof), flash, RAM, ROM, and other memory devices, and the like.

While at least one presently preferred embodiment of the present disclosure has been described using specific terms, such description is for illustrative purposes only, and it is to be understood that changes and variations may be made without departing from the spirit or scope of the following claims.

What is claimed is:

1. A method, performed by a computing system having a processor and memory, of managing inventory in at least one enterprise resource database using a component management system, the method comprising:
   maintaining at least one queue at the computing device of the component management system;
   for each of one or more components configured to be associated with at least one manufacturing asset, specifying component stocking requirements for the component;

placing an asset definition document into the at least one queue, the asset definition document comprising data identifying the one or more component stocking requirements;

receiving design data defining one or more modifications to the one or more component stocking requirements, wherein the one or more modifications to the one or more component stocking requirements specify at least one of a modification to a quantity requirement for the one or more components configured to be associated with at least one manufacturing asset or a modification to an ordering schedule for the one or more components configured to be associated with the at least one manufacturing asset;

in response to receiving the design data, updating by the processor the asset definition document to reflect the one or more modifications to the one or more component stocking requirements defined by the received design data;

for a currently-stocked component, updating a first authority to stock document to reflect at least one of the one or more modifications to the one or more component stocking requirements defined by the received design data;

for a previously-unstocked component, generating a second authority to stock document to reflect at least one of the one or more modifications to the one or more component stocking requirements defined by the received design data;

transmitting the updated first authority to stock document, the generated second authority to stock document, and the updated asset definition document over a network for approval by a supervisor with final approval authority;

receiving approval data for the updated first authority to stock document, the generated second authority to stock document, and the updated asset definition document; and based on the received approval data, modifying the at least one enterprise resource database to include data specified by the updated first authority to stock document, the generated second authority to stock document, and the updated asset definition document.

2. The method as set forth in claim 1, further comprising:
prior to receiving the design data, receiving selection data identifying at least one manufacturing asset;
querying at least one enterprise management dataset for data associated with the at least one identified manufacturing asset; and
based on the results of the query, generating an asset definition document;
wherein placing comprises placing the generated asset definition document into the at least one queue.

3. The method as set forth in claim 2, further comprising:
prior to querying, accessing at least one enterprise resource planning database and creating an image of a plurality of portions of the database, each portion associated with a manufacturing asset;
wherein the enterprise management dataset comprises the imaged portions of the enterprise resource planning database.

4. The method as set forth in claim 3, wherein an image of at least one portion of a selected one of the at least one enterprise resource planning database is updated based on determining whether a manufacturing asset or assets associated with the at least one portion of the selected enterprise resource planning database is associated with an active project.

5. The method as set forth in claim 2, further comprising:
determining a change or changes to at least one component stocking requirement associated with the at least one manufacturing asset based on data included in at least one version of an asset definition document associated with the manufacturing asset.

6. The method as set forth in claim 5, further comprising:
based on the determined change or changes to the at least one component stocking requirement, generating a component stocking forecast document;
wherein the component stocking forecast document comprises data defining at least one projected change in a component stocking requirement at a facility.

7. The method as set forth in claim 6, wherein generating a component stocking forecast document comprises:
accessing data indicating a projected date associated with each determined change;
querying at least one enterprise management dataset for data defining current component stocking requirements for the facility; and
simulating future component stocking requirements for the facility based on the current component stocking requirements, the determined change or changes in at least one component stocking requirement, and the projected date associated with each determined change.

8. The method as set forth in claim 1, further comprising:
maintaining at least a first and second queue, wherein placing comprises placing the asset definition document in the first queue;
receiving release data regarding at least one asset definition document in the first queue; and
transferring the at least one asset definition document to the second queue in response to receiving the release data.

9. The method as set forth in claim 8, further comprising:
receiving supervisory design data defining one or more supervisory modifications to the component stocking requirements identified in the asset definition document in the second queue;
updating the asset definition document in the second queue to define the at least one component stocking requirement as modified; and
based on the one or more component stocking requirements as modified, determining whether authority to stock approval is needed.

10. The method as set forth in claim 8, further comprising:
receiving approval data for at least one asset definition document in the second queue;
in response to determining that the approval data indicates approval, modifying data in at least one enterprise management database to reflect at least one component stocking requirement for a manufacturing asset as defined in the asset definition document in the second queue; and
in response to determining that the approval data indicates rejection, placing the at least one asset definition document in the at least one other queue without modifying the at least one enterprise management database.

11. The method as set forth in claim 8, wherein maintaining comprises maintaining at least a first, second, and third queue, and wherein the method further comprises:
receiving approval data regarding at least one asset definition document in the second queue;
in response to determining that the approval data indicates approval, placing the at least one asset definition document in the third queue; and in response to determining that the approval data indicates rejection, placing the at least one asset definition document in a queue other than the third queue.

12. The method as set forth in claim 8, wherein the method comprises placing the first authority to stock document in a first queue, and wherein the method further comprises:
   maintaining at least a second queue;
   receiving release data regarding at least one authority to stock document in the first queue; and transferring the at least one authority to stock document to the second queue in response to the release data.

13. A component management system for managing inventory in at least one enterprise resource database, the component management system comprising at least one computing device, the at least one computing device adapted to:
   maintain at least one queue;
   for each of one or more components configured to be associated with at least one manufacturing asset, specify component stocking requirements for the component;
   place an asset definition document into the at least one queue, the asset definition document comprising data identifying the one or more component stocking requirements associated with at least one manufacturing asset;
   receive design data defining one or more modifications to the one or more component stocking requirements, wherein the one or more component stocking requirements include a quantity requirement for a component, a location in which to stock a component, or an ordering schedule for a component;
   in response to receiving the design data, update the asset definition document to identify the one or more component stocking requirements as modified; and
   update a first authority to stock document for a currently-stocked component to reflect at least one of the one or more modifications to the one or more component stocking requirements defined by the received design data;
   generate a second authority to stock document for a previously-unstocked component to reflect at least one of the one or more modifications to the one or more component stocking requirements defined by the received design data;
   transmit the updated first authority to stock document, the generated second authority to stock document, and the updated asset definition document over a network for approval by a supervisor with final approval authority;
   receive approval data for the updated first authority to stock document, the generated second authority to stock document, and the updated asset definition document; and
   based on the received approval data, modify the at least one enterprise resource database to include data specified in the updated first authority to stock document, the generated second authority to stock document, and the updated asset definition document.

14. The system as set forth in claim 13, wherein the at least one computing device is further adapted to:
   prior to receiving the design data, receive selection data identifying at least one manufacturing asset;
   query at least one enterprise management dataset for data associated with the at least one identified manufacturing asset; and
   based on the results of the query, generate an asset definition document;
   wherein placing comprises placing the generated asset definition document into the at least one queue.

15. The system as set forth in claim 14, wherein the at least one computing device is further adapted to:
   prior to querying, access at least one enterprise resource planning database and create an image of a plurality of portions of the database, each portion associated with a manufacturing asset;
   wherein the enterprise management dataset comprises the imaged portions of the enterprise resource planning database.

16. The system as set forth in claim 15, wherein an image of at least one portion of a selected one of the at least one enterprise resource planning database is updated based on determining whether the manufacturing asset or assets associated with the at least one portion of the selected enterprise resource planning database is included in an active project.

17. The system as set forth in claim 14, wherein the at least one computing device is further adapted to:
   determine a change or changes to at least one component stocking requirement associated with the at least one manufacturing asset based on data included in at least one version of an asset definition document associated with the at least one manufacturing asset.

18. The system as set forth in claim 17, wherein the at least one computing device is further adapted to:
   based on the determined change or changes to the at least one manufacturing asset, generate a component stocking forecast document;
   wherein the component stocking forecast document comprises data defining at least one projected change in an installed base of components.

19. The system as set forth in claim 18, wherein, to generate a parts forecast document the at least one computing device is further adapted to:
   access data indicating a projected date associated with each determined change;
   query at least one enterprise management database for data defining the current installed base of components; and
   simulate at least one future installed base of components at a future date based on the current installed base, the determined change or changes in at least one component stocking requirement, and the projected date associated with each determined change.

20. The system as set forth in claim 13, wherein the at least one computing device is further adapted to:
   maintain at least a first and second queue, wherein the asset definition document is placed in the first queue;
   receive release data regarding at least one asset definition document in the first queue; and
   transfer the at least one asset definition document to the second queue in response to receiving the release data.

21. The system as set forth in claim 20, wherein the at least one computing device is further adapted to:
   receive supervisory design data defining one or more supervisory modifications to the component stocking requirements identified in the asset definition document in the second queue;
   update the asset definition document in the second queue to define the at least one manufacturing asset as modified; and
   based on the one or more component stocking requirements as modified, determine whether authority to stock approval is needed.

22. The system as set forth in claim 20, wherein the at least one computing device is further adapted to:
   receive approval data for at least one asset definition document in the second queue;

in response to determining that the approval data indicates approval, provide data to an enterprise resource planning system to change data maintained by the enterprise resource planning system so as to reflect the at least one component stocking requirement for a manufacturing asset as defined in the asset definition document in the second queue; and in response to determining that the approval data indicates rejection, place the at least one asset definition document in the at least one other queue without providing data to change data maintained by the at least one enterprise management database.

23. The system as set forth in claim 20, wherein maintaining comprises maintaining at least a first, second, and third queue, and wherein the at least one computing device is further adapted to:

receive approval data regarding at least one asset definition document in the second queue;

in response to determining that the approval data indicates approval, place the at least one asset definition document in the third queue; and in response to determining that the approval data indicates rejection, place the at least one asset definition document in a queue other than the third queue.

24. The system as set forth in claim 13, wherein the at least one computing device is adapted to place an authority to stock document in a first queue and the at least one computing device is further adapted to:

maintain at least a second queue;

receive release data regarding at least one authority to stock document in the first queue; and transfer the at least one authority to stock document in the first queue to the second queue in response to the release data.

25. The method as set forth in claim 1, wherein the first authority to stock document further comprises a formula for determining procurement time for the currently-stocked component and a formula for determining a replacement interval for the currently-stocked component.

26. The method as set forth in claim 1, further comprising: associating at least one of the one or more components with the manufacturing asset.

27. A computer-readable storage device having instructions stored thereon, the instructions comprising:

instructions for maintaining at least one queue;

instructions for specifying component stocking requirements for each of one or more components configured to be associated with at least one manufacturing asset;

instructions for placing an asset definition document into the at least one queue, the asset definition document comprising data identifying the one or more component stocking requirements;

instructions for receiving design data defining one or more modifications to the one or more component stocking requirements, wherein the one or more component stocking requirements include a quantity requirement for a component or an ordering schedule for a component;

instructions for, in response to receiving the design data, updating the asset definition document to include the one or more component stocking requirements as modified;

instructions for updating a first authority to stock document for a currently-stocked component to reflect at least one of the one or more modifications to the one or more component stocking requirements defined by the received design data;

instructions for generating a second authority to stock document for a previously-unstocked component to reflect at least one of the one or more modifications to the one or more component stocking requirements defined by the received design data;

instructions for transmitting the updated first authority to stock document, the generated second authority to stock document, and the updated asset definition document over a network for approval by a supervisor with final approval authority;

instructions for receiving approval data for the updated first authority to stock document, the generated second authority to stock document, and the updated asset definition document; and instructions for modifying, based on the received approval data, the at least one enterprise resource database to include data specified in the updated first authority to stock document, the generated second authority to stock document, and the updated asset definition document.

28. The computer-readable storage device of claim 27, the instructions further comprising:

instructions for, in response to receiving from the supervisor an indication of a modification to the updated asset definition document, triggering deletion of the first authority to stock document.

29. The computer-readable storage device of claim 28, the instructions further comprising:

instructions for determining, based on the one or more modified requirements, whether authority to stock approval is needed for at least one component.

30. The computer-readable storage device of claim 27, the instructions further comprising:

instructions for associating the previously-unstocked component with the manufacturing asset.

31. The method of claim 1, further comprising:

for at least one of the one or more components configured to be associated with the at least one manufacturing asset, determining whether the component is currently-stocked or currently-unstocked.

32. The method of claim 1, further comprising:

determining required timing for approval of the first authority to stock document based on an effective date of a design change;

determining required timing for approval of the second authority to stock document based on the effective date; and prioritizing the first authority to stock document and the second authority to stock document based on the determined required timings for approval.

* * * * *

UNITED STATES PATENT AND TRADEMARK OFFICE
CERTIFICATE OF CORRECTION

PATENT NO. : 8,099,336 B2  Page 1 of 1
APPLICATION NO. : 11/757050
DATED : January 17, 2012
INVENTOR(S) : Klim et al.

It is certified that error appears in the above-identified patent and that said Letters Patent is hereby corrected as shown below:

Column 34, line 33, in Claim 19, delete "document the" and insert -- document, the --.

Signed and Sealed this
Third Day of July, 2012

David J. Kappos
*Director of the United States Patent and Trademark Office*